US012663736B2

(12) United States Patent
Sato et al.

(10) Patent No.: US 12,663,736 B2
(45) Date of Patent: Jun. 23, 2026

(54) TONER

(71) Applicant: CANON KABUSHIKI KAISHA, Tokyo (JP)

(72) Inventors: Kazuyuki Sato, Kanagawa (JP); Tomohisa Sano, Shizuoka (JP); Tohru Hiramatsu, Shizuoka (JP); Hiroki Kagawa, Shizuoka (JP); Shohei Shibahara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 588 days.

(21) Appl. No.: 18/307,829

(22) Filed: Apr. 27, 2023

(65) Prior Publication Data

US 2023/0408946 A1 Dec. 21, 2023

(30) Foreign Application Priority Data

Apr. 28, 2022 (JP) ................................ 2022-074949

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 9/113*** | (2006.01) |

(52) U.S. Cl.
CPC ......... *G03G 9/1139* (2013.01); *G03G 9/0812* (2013.01); *G03G 9/08755* (2013.01)

(58) Field of Classification Search
CPC ....................... G03G 9/09708; G03G 9/09725
See application file for complete search history.

(56) References Cited

U.S. PATENT DOCUMENTS 5,641,601 A 6/1997 Mitani et al.
5,686,054 A 11/1997 Barthel et al.
5,981,131 A 11/1999 Hirama et al.
6,287,739 B1 9/2001 Kawakami et al.
(Continued)

FOREIGN PATENT DOCUMENTS

EP 2 799 929 A1 11/2014
EP 2 853 945 A1 4/2015
(Continued)

OTHER PUBLICATIONS

Translation of JP 2007-176747, published JP 2007-176747.*
(Continued)

*Primary Examiner* — Peter L Vajda
(74) *Attorney, Agent, or Firm* — VENABLE LLP

(57) ABSTRACT

A toner comprises a toner particle and silica fine particles, wherein, fragment ions of a D unit structure are observed in time-of-flight secondary ion mass spectrometry measurement of the silica fine particles, in a titration operation of the silica fine particles using NaOH, the titer is within a specific range, an area of a peak from −25 to −15 ppm in $^{29}$Si-NMR measurement of the silica fine particles is denoted by D, the sum of the areas of peaks from −140 to 100 ppm is denoted by S, and an area of a peak from more than −19 ppm to −17 ppm or less is denoted by D1, the specific surface area of the silica fine particles, D, D1, and S satisfy specific relationships, and a specific amount of a specific polyvalent metal element is present on the surface of the toner particle.

8 Claims, 1 Drawing Sheet

(56) References Cited

U.S. PATENT DOCUMENTS

| | | | |
|---|---|---|---|
| 7,001,703 | B2 | 2/2006 | Moribe |
| 7,097,951 | B2 | 8/2006 | Moribe |
| 7,123,862 | B2 | 10/2006 | Hasegawa |
| 7,147,981 | B2 | 12/2006 | Fujikawa |
| 7,267,919 | B2 | 9/2007 | Moribe |
| 7,279,262 | B2 | 10/2007 | Fujikawa |
| 7,368,211 | B2 | 5/2008 | Hasegawa |
| 7,402,368 | B2 | 7/2008 | Ogawa |
| 7,422,832 | B2 | 9/2008 | Ogawa |
| 7,470,494 | B2 | 12/2008 | Nishiyama |
| 7,582,401 | B2 | 9/2009 | Ogawa |
| 7,678,523 | B2 | 3/2010 | Hiroko |
| 7,678,524 | B2 | 3/2010 | Hasegawa |
| 7,704,659 | B2 | 4/2010 | Ogawa |
| 7,811,734 | B2 | 10/2010 | Ogawa |
| 7,855,042 | B2 | 12/2010 | Kobori |
| 7,923,190 | B2 | 4/2011 | Magome |
| 7,935,467 | B2 | 5/2011 | Dojo |
| 7,939,231 | B2 | 5/2011 | Ogawa |
| 8,084,174 | B2 | 12/2011 | Hasegawa |
| 8,124,306 | B2 | 2/2012 | Hirata |
| 8,227,162 | B2 | 7/2012 | Sano |
| 8,426,091 | B2 | 4/2013 | Magome |
| 8,426,094 | B2 | 4/2013 | Magome |
| 8,501,377 | B2 | 8/2013 | Takahashi |
| 8,512,925 | B2 | 8/2013 | Moribe |
| 8,518,620 | B2 | 8/2013 | Dojo |
| 8,614,044 | B2 | 12/2013 | Matsui |
| 8,778,585 | B2 | 7/2014 | Matsui |
| 8,841,054 | B2 | 9/2014 | Dojo |
| 9,046,800 | B2 | 6/2015 | Hotta |
| 9,097,998 | B2 | 8/2015 | Yamazaki |
| 9,128,400 | B2 | 9/2015 | Takahashi |
| 9,152,065 | B2 | 10/2015 | Sano |
| 9,152,088 | B1 | 10/2015 | Kobori |
| 9,158,217 | B2 | 10/2015 | Takahashi |
| 9,229,345 | B2 | 1/2016 | Ikeda |
| 9,235,151 | B2 | 1/2016 | Tanaka |
| 9,348,253 | B2 | 5/2016 | Kanno |
| 9,372,420 | B2 | 6/2016 | Mizo |
| 9,377,708 | B2 | 6/2016 | Magome |
| 9,417,540 | B2 | 8/2016 | Hashimoto |
| 9,423,708 | B2 | 8/2016 | Tominaga et al. |
| 9,436,112 | B2 | 9/2016 | Iwasaki |
| 9,454,094 | B2 | 9/2016 | Tsujimoto |
| 9,551,947 | B2 | 1/2017 | Hiroko |
| 9,606,466 | B2 | 3/2017 | Takahashi |
| 9,651,883 | B2 | 5/2017 | Hama |
| 9,665,021 | B2 | 5/2017 | Ohtsu |
| 9,665,023 | B2 | 5/2017 | Kamae |
| 9,665,026 | B2 | 5/2017 | Iwasaki |
| 9,671,707 | B2 | 6/2017 | Minagawa |
| 9,703,216 | B2 | 7/2017 | Tsuchida |
| 9,785,068 | B2 | 10/2017 | Umeda |
| 9,804,514 | B2 | 10/2017 | Suzumura |
| 9,804,519 | B2 | 10/2017 | Suzumura |
| 9,829,816 | B2 | 11/2017 | Tanaka |
| 9,841,692 | B2 | 12/2017 | Hasegawa |
| 9,880,478 | B2 | 1/2018 | Shimano |
| 9,897,934 | B2 | 2/2018 | Tamura |
| 9,915,885 | B2 | 3/2018 | Katsumata |
| 9,927,728 | B2 | 3/2018 | Arimura |
| 9,946,179 | B2 | 4/2018 | Arimura |
| 9,946,181 | B2 | 4/2018 | Hasegawa |
| 9,964,874 | B2 | 5/2018 | Suzumura |
| 9,964,881 | B2 | 5/2018 | Ikejiri |
| 9,969,834 | B2 | 5/2018 | Ohtsu |
| 9,971,262 | B2 | 5/2018 | Hasegawa |
| 9,971,264 | B2 | 5/2018 | Sano |
| 10,012,918 | B2 | 7/2018 | Ishigami |
| 10,012,920 | B2 | 7/2018 | Shibata |
| 10,012,921 | B2 | 7/2018 | Kamae |
| 10,012,923 | B2 | 7/2018 | Sano |
| 10,036,970 | B2 | 7/2018 | Kanno |
| 10,078,281 | B2 | 9/2018 | Ida |
| 10,082,743 | B2 | 9/2018 | Hama |
| 10,088,765 | B2 | 10/2018 | Miyakai |
| 10,114,303 | B2 | 10/2018 | Katsura |
| 10,133,201 | B2 | 11/2018 | Kamae |
| 10,146,146 | B2 | 12/2018 | Komatsu |
| 10,151,990 | B2 | 12/2018 | Suzuki |
| 10,175,595 | B2 | 1/2019 | Onozaki |
| 10,197,936 | B2 | 2/2019 | Onozaki |
| 10,203,619 | B2 | 2/2019 | Yamashita |
| 10,216,108 | B2 | 2/2019 | Iwasaki |
| 10,228,627 | B2 | 3/2019 | Nagashima |
| 10,228,629 | B2 | 3/2019 | Tamura |
| 10,234,777 | B2 | 3/2019 | Ohtsu |
| 10,295,920 | B2 | 5/2019 | Nishikawa |
| 10,303,075 | B2 | 5/2019 | Tanaka |
| 10,310,397 | B2 | 6/2019 | Sano |
| 10,353,312 | B2 | 7/2019 | Kamae |
| 10,401,748 | B2 | 9/2019 | Hashimoto |
| 10,423,090 | B2 | 9/2019 | Ohtsu |
| 10,451,985 | B2 | 10/2019 | Takahashi |
| 10,451,986 | B2 | 10/2019 | Sano |
| 10,451,990 | B2 | 10/2019 | Kamae |
| 10,474,049 | B2 | 11/2019 | Onozaki |
| 10,514,624 | B2 | 12/2019 | Tamura |
| 10,545,420 | B2 | 1/2020 | Kinumatsu |
| 10,551,759 | B2 | 2/2020 | Watanabe |
| 10,564,560 | B2 | 2/2020 | Onozaki et al. |
| 10,642,178 | B2 | 5/2020 | Yamashita |
| 10,698,327 | B2 | 6/2020 | Nagashima |
| 10,747,132 | B2 | 8/2020 | Takahashi |
| 10,768,543 | B2 | 9/2020 | Tsujimoto |
| 10,775,710 | B1 | 9/2020 | Kamae |
| 10,782,623 | B2 | 9/2020 | Yoshiba et al. |
| 10,838,317 | B2 | 11/2020 | Sugahara |
| 10,859,935 | B2 | 12/2020 | Ohtsu |
| 10,859,936 | B2 | 12/2020 | Sugahara |
| 10,877,386 | B2 | 12/2020 | Murayama |
| 10,877,391 | B2 | 12/2020 | Matsuo |
| 10,935,902 | B2 | 3/2021 | Kanno |
| 10,955,765 | B2 | 3/2021 | Onozaki |
| 10,969,704 | B2 | 4/2021 | Kagawa |
| 11,079,695 | B2 | 8/2021 | Sato |
| 11,099,493 | B2 | 8/2021 | Komiya |
| 11,112,709 | B2 | 9/2021 | Saeki |
| 11,112,713 | B2 | 9/2021 | Akiyama |
| 11,131,938 | B2 | 9/2021 | Murayama |
| 11,181,844 | B2 | 11/2021 | Nagaoka |
| 11,249,410 | B2 | 2/2022 | Takahashi |
| 11,415,902 | B2 | 8/2022 | Watanabe |
| 11,429,032 | B2 | 8/2022 | Shibata |
| 11,448,980 | B2 | 9/2022 | Matsui |
| 11,531,284 | B2 | 12/2022 | Iguchi et al. |
| 11,698,594 | B2 | 7/2023 | Takahashi |
| 2003/0031946 | A1 | 2/2003 | Sugiura et al. |
| 2006/0067867 | A1 | 3/2006 | Ishibashi et al. |
| 2010/0273103 | A1 | 10/2010 | Baba et al. |
| 2011/0311910 | A1 | 12/2011 | Matsui et al. |
| 2012/0107741 | A1 | 5/2012 | Hiraoka et al. |
| 2013/0296578 | A1 | 11/2013 | Amano et al. |
| 2014/0377696 | A1 | 12/2014 | Hasegawa et al. |
| 2015/0185644 | A1 | 7/2015 | Matsui |
| 2015/0378274 | A1 | 12/2015 | Abe et al. |
| 2018/0074421 | A1 | 3/2018 | Uchino |
| 2018/0246430 | A1 | 8/2018 | Tanaka et al. |
| 2019/0113858 | A1 | 4/2019 | Kamae et al. |
| 2019/0137902 | A1 | 5/2019 | Shibata |
| 2021/0055668 | A1 | 2/2021 | Tamura |
| 2021/0255557 | A1 | 8/2021 | Watanabe |
| 2021/0286282 | A1 | 9/2021 | Kobori |
| 2021/0302853 | A1 | 9/2021 | Murata |
| 2021/0302854 | A1 | 9/2021 | Kitamura |
| 2021/0302855 | A1 | 9/2021 | Torii |
| 2021/0302856 | A1 | 9/2021 | Nagashima |
| 2021/0397106 | A1 | 12/2021 | Kobori |
| 2022/0026822 | A1 | 1/2022 | Sato |
| 2022/0026823 | A1 | 1/2022 | Sano |
| 2022/0050398 | A1 | 2/2022 | Ooyama |
| 2022/0128916 | A1 | 4/2022 | Yoshida |
| 2022/0171302 | A1 | 6/2022 | Sato |

(56) References Cited

U.S. PATENT DOCUMENTS

| | | | |
|---|---|---|---|
| 2022/0171303 | A1 | 6/2022 | Hiramatsu |
| 2022/0252995 | A1 | 8/2022 | Tsujimoto |
| 2022/0326633 | A1 | 10/2022 | Aoki |
| 2022/0373906 | A1 | 11/2022 | Ohmori |
| 2022/0373911 | A1 | 11/2022 | Kamae |
| 2022/0373919 | A1 | 11/2022 | Imura |
| 2023/0014130 | A1 | 1/2023 | Sano |
| 2023/0122974 | A1 | 4/2023 | Kagawa |
| 2023/0152725 | A1 | 5/2023 | Ochi |
| 2023/0408946 | A1 | 12/2023 | Sato et al. |

FOREIGN PATENT DOCUMENTS

| | | | | |
|---|---|---|---|---|
| JP | 7-330324 | A | 12/1995 | |
| JP | 9-204065 | A | 8/1997 | |
| JP | 11-174727 | A | 7/1999 | |
| JP | 2000-147831 | A | 5/2000 | |
| JP | 2002-23413 | A | 1/2002 | |
| JP | 2002-139862 | A | 5/2002 | |
| JP | 2002-182423 | A | 6/2002 | |
| JP | 2002-256173 | A | 9/2002 | |
| JP | 2004-126249 | A | 4/2004 | |
| JP | 2004-126251 | A | 4/2004 | |
| JP | 2007-114630 | A | 5/2007 | |
| JP | 2007-176747 | * | 7/2007 | ............ C01B 33/18 |
| JP | 2007-176747 | A | 7/2007 | |
| JP | 2008-145490 | A | 6/2008 | |
| JP | 2009-31426 | A | 2/2009 | |
| JP | 2009-271394 | A | 11/2009 | |
| JP | 2009-276643 | A | 11/2009 | |
| JP | 2012-236752 | A | 12/2012 | |
| JP | 2015-11070 | A | 1/2015 | |
| JP | 2016-66049 | A | 4/2016 | |
| JP | 2016-167029 | A | 9/2016 | |
| JP | 2019-3082 | A | 1/2019 | |
| JP | 2019-86705 | A | 6/2019 | |
| JP | 2019-109416 | A | 7/2019 | |
| JP | 2020-91471 | A | 6/2020 | |
| JP | 2020-95081 | A | 6/2020 | |
| JP | 2020-154294 | A | 9/2020 | |
| JP | 2021-148999 | A | 9/2021 | |
| WO | 2004060803 | A1 | 7/2004 | |

OTHER PUBLICATIONS

U.S. Appl. No. 18/173,255, filed Feb. 23, 2023, Takayuki Toyoda.
U.S. Appl. No. 18/307,825, filed Apr. 27, 2023, Hiroki Kagawa.
U.S. Appl. No. 18/307,826, filed Apr. 27, 2023, Ryuichiro Matsuo.
U.S. Appl. No. 18/307,827, filed Apr. 27, 2023, Shin Kitamura.
U.S. Appl. No. 18/307,828, filed Apr. 27, 2023, Daisuke Tsujimoto.
U.S. Appl. No. 18/307,832, filed Apr. 27, 2023, Shohei Shibahara.
Echa Reach Registration Dossier, https://echa.europa.eu/registration-dossier/-/registered-dossier/15289/4/13.

* cited by examiner

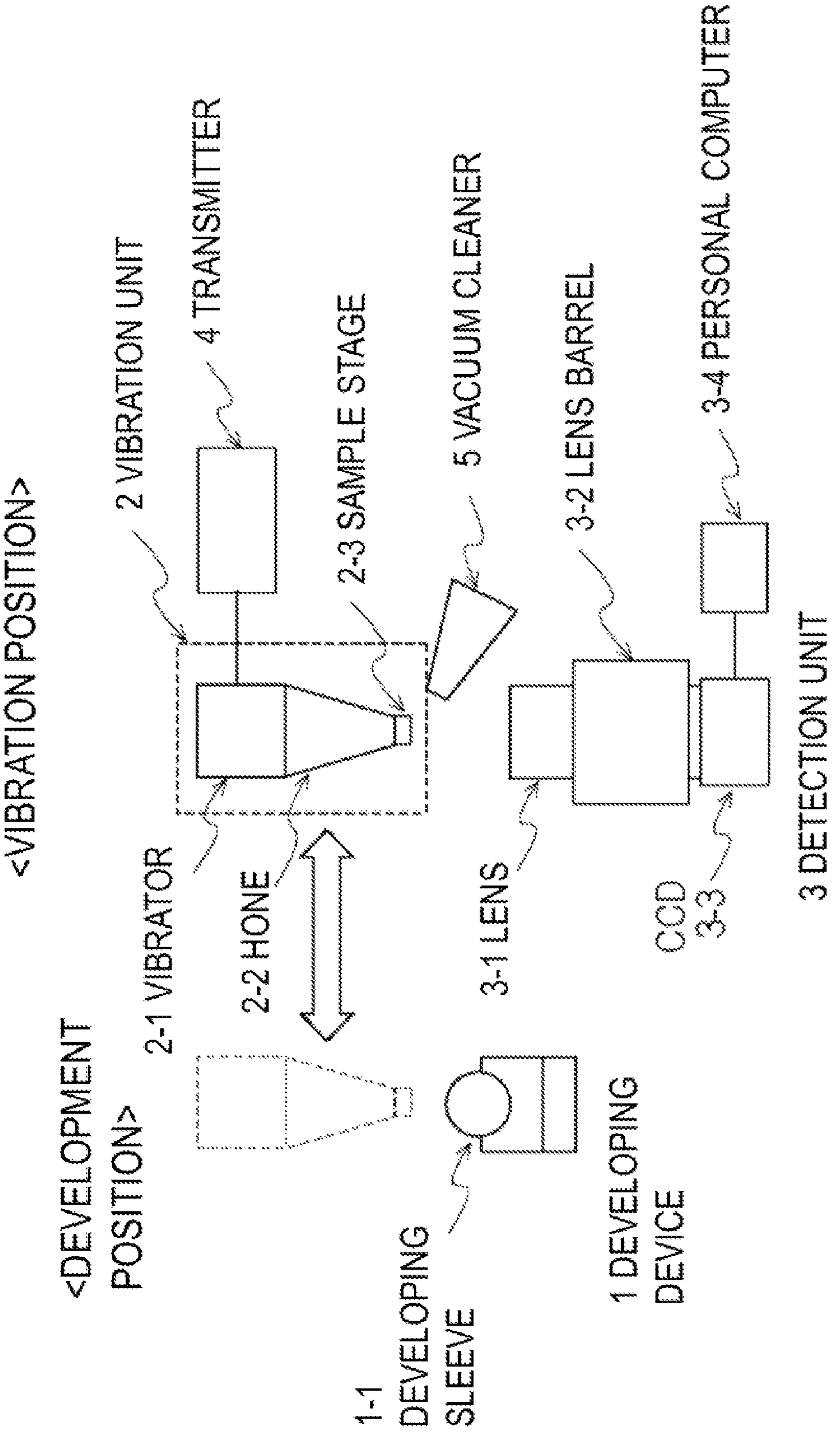
<VIBRATION POSITION>
<DEVELOPMENT POSITION>
2 VIBRATION UNIT
4 TRANSMITTER
2-3 SAMPLE STAGE
5 VACUUM CLEANER
3-2 LENS BARREL
3-4 PERSONAL COMPUTER
2-1 VIBRATOR
2-2 HONE
3-1 LENS
CCD 3-3
3 DETECTION UNIT
1-1 DEVELOPING SLEEVE
1 DEVELOPING DEVICE

TONER

BACKGROUND OF THE INVENTION

Field of the Invention

The present disclosure relates to a toner for use in an image forming method such as electrophotography.

Description of the Related Art

In electrophotographic technique, an electrostatic latent image is formed on a uniformly charged photosensitive member, and image information is visualized with a charged toner, and such technique is used in devices such as copiers and printers. In recent years, there has been a demand for longer service life and the ability to obtain high-quality images regardless of the environment in order to support the diverse usage of copiers and printers.

Japanese Patent Application Publication No. 2009-271394 discloses a toner in which the amount of a polyvalent metal element is controlled to obtain excellent transferability. By suppressing fluctuations in the moisture content of the toner and improving the environmental stability of the toner charge quantity, it is possible to suppress transfer dust and image graininess.

Japanese Patent Application Publication No. 2020-154294 discloses a toner in which spherical silica is externally added to a toner particle in which the amount of a polyvalent metal element is controlled in order to improve the charge rising performance of the toner in a high-temperature and high-humidity environment.

SUMMARY OF THE INVENTION

However, with the toner disclosed in Japanese Patent Application Publication No. 2009-271394, a liquid-bridging force between the toner and the photosensitive drum increases due to the influence of moisture present on the toner surface in a high-temperature and high-humidity environment. As a result, transfer unevenness (image unevenness caused by a local decrease in transfer efficiency in a transfer process) tends to occur.

In addition, although the toner disclosed in Japanese Patent Application Publication No. 2020-154294 can suppress fogging in a high-temperature and high-humidity environment, the liquid-bridging force between the toner and the photosensitive drum increases, resulting in transfer unevenness.

For the above reasons, there is a demand for a toner that suppresses an increase in the liquid-bridging force between the toner and the photosensitive drum and that causes less transfer unevenness in a high-temperature and high-humidity environment.

The present disclosure provides a toner that suppresses an increase in the liquid-bridging force between the toner and the photosensitive drum and that causes less transfer unevenness in a high-temperature and high-humidity environment.

The present disclosure relates to a toner comprising a toner particle, and a silica fine particle on a surface of the toner particle, wherein fragment ions corresponding to a structure represented by a following formula (1) are observed in a time-of-flight secondary ion mass spectrometry measurement of the silica fine particle,

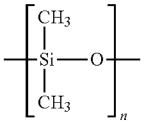

(1)

in the formula (1), n represents an integer of 1 or more, where 2.00 g of the silica fine particle is dispersed in a mixed liquid of 25.0 g of ethanol and 75.0 g of a 20% by mass NaCl aqueous solution and a titration operation using sodium hydroxide is performed, Sn defined by a formula $Sn=\{(a-b)\times c\times NA\}/(d\times e)$ satisfies a following formula (2), $$0.05\leq Sn\leq 0.20 \quad (2)$$

in the formula $Sn=\{(a-b)\times c\times NA\}/(d\times e)$, a is a NaOH titer (L) required to adjust the mixed liquid, in which the silica fine particle is dispersed, to pH 9.0, b is a NaOH titer (L) required to adjust the mixed liquid of 25.0 g of ethanol and 75.0 g of a 20% by mass NaCl aqueous solution to pH 9.0, c is the concentration (mol/L) of the NaOH solution used for titration, NA is an Avogadro's number, d is the mass (g) of the silica fine particle, and e is a BET specific surface area ($nm^2/g$) of the silica fine particle, where, in a chemical shift obtained by a solid-state $^{29}$Si-NMR DD/MAS method of the silica fine particle, an area of a peak having a peak top present in a range from −25 to −15 ppm is denoted by D, the sum of the peak areas of an M unit, a D unit, a T unit, and a Q unit present in a range from −140 ppm to 100 ppm is denoted by S, and a specific surface area of the silica fine particle is denoted by B ($m^2/g$), a value (D/S)/B of the ratio of (D/S) to B is $5.7\times10^{-4}$ to $4.9\times10^{-3}$, the (D/S)/B measured after washing the silica fine particle with chloroform is $1.7\times10^{-4}$ to $4.9\times10^{-3}$, where an area of a peak having a peak top present in a range from more than −19 ppm to −17 ppm or less in the chemical shift is denoted by D1, a value (D1/D) of the ratio of D1 to D is 0.10 to 0.30, at least one polyvalent metal element selected from the group consisting of calcium, magnesium, aluminum, and iron is present on the surface of the toner particle, and a total content of the polyvalent metal element measured by a method described in a measurement method (a) to (c) hereinbelow is 1 to 2000 ppm by mass.

(Measurement Method)

(a) The polyvalent metal element on the surface of the toner particle is extracted by stirring 50.0 mg of the toner particles with 5.00 g of 6.0 mol/L nitric acid aqueous solution to obtain an extract.

(b) The extract obtained by extracting the polyvalent metal element is filtered to prepare a measurement sample.

(c) The measurement sample is measured with an inductively coupled plasma mass spectrometer to determine a content of the polyvalent metal element based on the mass of the measurement sample.

The present disclosure provides a toner that suppresses an increase in the liquid-bridging force between the toner and the photosensitive drum and that causes less transfer unevenness in a high-temperature and high-humidity environment.

Further features of the present invention will become apparent from the following description of exemplary embodiments with reference to the attached drawings.

BRIEF DESCRIPTION OF THE DRAWINGS

The FIGURE is a schematic diagram of a device for measuring a liquid-bridging force.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. Further, a monomer unit refers to the reacted form of the monomer substance in the polymer.

In the transfer process of electrophotography, the toner image formed on the surface of a photosensitive member is transferred and caused to adhere to paper. In order to obtain a high-quality image, it is important to transfer the toner image on the photosensitive member, which is obtained in a development process, to the paper as it is without destroying the toner image.

In addition, it is known that the transfer process is greatly affected by the environment in which the transfer process is implemented, and various image defects occur in a low-temperature and low-humidity environment and a high-temperature and high-humidity environment. For example, in a low-temperature and low-humidity environment, toner charge may increase, causing transfer dust (the movement of the toner at the edge of an image to a non-image area). In a high-temperature and high-humidity environment, the charge of the toner decreases, which may cause a decrease in graininess (non-uniform image density) in halftones. To solve these problems, the present inventors have investigated a toner particle in which the amount of a polyvalent metal element is controlled.

However, even if the amount of a polyvalent metal element in the toner particle is controlled, the occurrence of transfer unevenness that occurs in a high-temperature and high-humidity environment cannot be suppressed. The investigation conducted by the present inventors showed that since a non-electrostatic adhesion force between the toner and the drum differs greatly between a low-temperature and low-humidity environment and a high-temperature and high-humidity environment, the liquid-bridging force between the toner and the drum increases and transfer unevenness occurs in a high-temperature and high-humidity environment.

As a result of intensive studies by the present inventors, it was found that the above problems can be solved by combining the above-described toner particle in which the amount of a polyvalent metal element is controlled with silica fine particles as described below. Silica fine particles will be explained hereinbelow.

First, the inventors focused on the surface of silica fine particles. The surface of silica fine particles is hydrophilic because it usually has OH groups derived from a silanol structure, that is, silanol groups, and easily adsorbs moisture in the air. For this reason, especially in a high-temperature and high-humidity environment, deterioration of charging performance due to moisture adsorption tends to occur.

However, the amount of silanol cannot be controlled and no improvement in charging performance in a high-temperature and high-humidity environment can be obtained by simply increasing the amount of a surface treatment agent for hydrophilizing the silica fine particle base to reduce the amount of silanol groups on the surface of the silica fine particles. In addition, the flowability of the toner is lowered, and image defects such as streaks and haze due to toner aggregation occur.

The inventors of the present invention have made extensive studies of external additives that make it possible to achieve the effect of improving charging performance and charge stability and to output images without adverse effects. As a result, a surface treatment component of the silica fine particles that has a polydimethylsiloxane structure and appropriate control of the amount of dimethylsiloxane on the surface of the silica fine particles and the amount of Si—OR groups (R is a hydrogen atom, a methyl group, or an ethyl group) at the end of the surface treatment structure were found to be effective.

That is, the present disclosure relates to a toner comprising a toner particle, and a silica fine particle on a surface of the toner particle, wherein fragment ions corresponding to a structure represented by a following formula (1) are observed in a time-of-flight secondary ion mass spectrometry measurement of the silica fine particle,

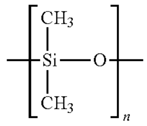

(1)

in the formula (1), n represents an integer of 1 or more, where 2.00 g of the silica fine particle is dispersed in a mixed liquid of 25.0 g of ethanol and 75.0 g of a 20% by mass NaCl aqueous solution and a titration operation using sodium hydroxide is performed, Sn defined by a formula $Sn=\{(a-b)\times c\times NA\}/(d\times e)$ satisfies a following formula (2), $$0.05\leq Sn\leq 0.20 \quad (2)$$

in the formula $Sn=\{(a-b)\times c\times NA\}/(d\times e)$, a is a NaOH titer (L) required to adjust the mixed liquid, in which the silica fine particle is dispersed, to pH 9.0, b is a NaOH titer (L) required to adjust the mixed liquid of 25.0 g of ethanol and 75.0 g of a 20% by mass NaCl aqueous solution to pH 9.0, c is the concentration (mol/L) of the NaOH solution used for titration, NA is an Avogadro's number, d is the mass (g) of the silica fine particle, and e is a BET specific surface area ($nm^2/g$) of the silica fine particle, where, in a chemical shift obtained by a solid-state $^{29}Si$-NMR DD/MAS method of the silica fine particle, an area of a peak having a peak top present in a range from −25 to −15 ppm is denoted by D, the sum of the peak areas of an M unit, a D unit, a T unit, and a Q unit present in a range from −140 ppm to 100 ppm is denoted by S, and a specific surface area of the silica fine particle is denoted by B ($m^2/g$), a value (D/S)/B of the ratio of (D/S) to B is $5.7\times10^{-4}$ to $4.9\times10^{-3}$, the (D/S)/B measured after washing the silica fine particle with chloroform is $1.7\times10^{-4}$ to $4.9\times10^{-3}$, where an area of a peak having a peak top present in a range from more than −19 ppm to −17 ppm or less in the chemical shift is denoted by D1, a value (D1/D) of the ratio of D1 to D is 0.10 to 0.30, at least one polyvalent metal element selected from the group consisting of calcium, magnesium, aluminum, and iron is present on the surface of the toner particle, and a total content of the polyvalent metal element measured by a method described in a measurement method (a) to (c) hereinbelow is 1 to 2000 ppm by mass.

(Measurement Method)

(a) The polyvalent metal element on the surface of the toner particle is extracted by stirring 50.0 mg of the toner particles with 5.00 g of 6.0 mol/L nitric acid aqueous solution to obtain an extract.

(b) The extract obtained by extracting the polyvalent metal element is filtered to prepare a measurement sample.

(c) The measurement sample is measured with an inductively coupled plasma mass spectrometer to determine a content of the polyvalent metal element based on the mass of the measurement sample.

By combining the silica fine particles having a polydimethylsiloxane structure with a toner particle in which the amount of a polyvalent metal element is controlled and controlling the amount of Si—OR groups (in particular Si—OH groups), the following DSB, DSB-W, and D1/D of the silicon fine particles it is possible to suppress an increase in the liquid-bridging force between the toner and the photosensitive drum in a high-temperature and high-humidity environment and to solve the problem of the occurrence of transfer unevenness. The reason is explained below.

The fact that the silica fine particles have been surface-treated can be confirmed by time-of-flight secondary ion mass spectrometry (TOF-SIMS).

In measurements of silica fine particles by time-of-flight secondary ion mass spectrometry TOF-SIMS, it is necessary to observe fragment ions corresponding to the structure represented by the formula (1). Observation of fragment ions represented by the formula (1) indicates that the silica fine particles have been surface-treated with a surface treatment agent having a polydimethylsiloxane structure. Polydimethylsiloxane is hydrophobic, and surface treatment with a treatment agent having a polydimethylsiloxane structure can prevent the silica fine particles from adsorbing moisture to the toner in a high-temperature and high-humidity environment.

(1)

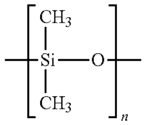

(In Formula (1), n is an integer of from 1 or more (preferably from 1 to 500, more preferably from 1 to 200, still more preferably from 1 to 100, and even more preferably from 1 to 80.)

TOF-SIMS is a method for analyzing the composition of a sample surface by irradiating the sample with ions and analyzing the mass of secondary ions emitted from the sample. Since the secondary ions are emitted from a region several nanometers deep from the sample surface, the structure near the surface of the silica fine particle can be analyzed. The mass spectrum of secondary ions obtained by the measurement represents fragment ions that reflect the molecular structure of the surface treatment agent of the silica fine particle.

Fragment ions corresponding to the structure represented by Formula (1) are observed in measurement of the silica fine particle by TOF-SIMS. In the present disclosure, a structural unit having this structure is defined as a D unit. Where fragment ions of D units are observed by TOF-SIMS, it means that the silica fine particle is surface-treated with a surface treatment agent including D units.

It is necessary to control the amount of Si—OR groups (R is a methyl group, an ethyl group, or a hydrogen atom) in the silica fine particles. The amount of Si—OR groups is the total amount of Si—OR groups on the surface of the silica fine particle base (silica fine particles before surface treatment) and in the surface treatment agent for the silica fine particles. The Si—OR group is polarized, has polarity like $Si—O^{\delta-}R^{\delta+}$, and coordinates with a polyvalent metal element on the toner particle surface, thereby suppressing the coordination and adsorption of water molecules on the toner particle surface.

Where the amount of Si—OR is small, a sufficient coordination structure for the polyvalent metal element cannot be obtained. In addition, when the amount of Si—OR is excessive, the Si—OR group can form a coordination structure, especially in a high-temperature and high-humidity environment, but moisture is adsorbed and the liquid-bridging force is increased by the polarization of the Si—OR group itself. Among the Si—OR groups, the silanol groups (Si—OH groups) on the surface of the silica fine particle base are particularly likely to adsorb moisture, and thus increase the liquid-bridging force.

The amount of Si—OH groups can be evaluated by the value Sn (number/$nm^2$) obtained from the titer of sodium hydroxide. This is because Si—OH of the silica fine particle base and the Si—OH groups of polydimethylsiloxane undergo a neutralization reaction with sodium hydroxide.

Specifically, where 2.00 g of the silica fine particles are dispersed in a mixed liquid of 25.0 g of ethanol and 75.0 g of a 20% by mass NaCl aqueous solution and a titration operation using sodium hydroxide is performed, Sn defined as $Sn=\{(a-b)\times c\times NA\}/(d\times e)$ satisfies the following formula (2), $$0.05\leq Sn\leq 0.20 \qquad (2)$$

in the formula $Sn=\{(a-b)\times c\times NA\}/(d\times e)$, a is a NaOH titer (L) required to adjust the mixed liquid, in which the silica fine particles are dispersed, to pH 9.0, b is a NaOH titer (L) required to adjust the mixed liquid of 25.0 g of ethanol and 75.0 g of a 20% by mass NaCl aqueous solution to pH 9.0, c is the concentration (mol/L) of the NaOH solution used for titration, NA is the Avogadro's number, d is the mass (g) of the silica fine particles, and e is a BET specific surface area ($nm^2/g$) of the silica fine particles.

The formula (2) shows the range of the amount Si—OH groups in the silica fine particles. The amount of Si—OH groups is the total sum of silanol groups on the surface of the silica fine particle base and Si—OH groups in the structure derived from the surface treatment agent of the silica fine particles.

Where Sn in the formula (2) is less than $0.05/nm^2$, a sufficient coordination structure with respect to the polyvalent metal element cannot be obtained. Also, where Sn exceeds $0.20/nm^2$, the polarization of the Si—OH group itself in a high-temperature and high-humidity environment adsorbs moisture and increases the liquid-bridging force. Sn is preferably $0.17/nm^2$ or less, more preferably $0.15/nm^2$ or less. The lower limit is preferably $0.08/nm^2$ or more, more preferably $0.13/nm^2$ or more.

Sn can be increased by performing the treatment under conditions where the reaction of the surface treatment agent does not proceed so that the Si—OH groups on the surface of the silica fine particle base remain, and by adding the treatment agent only in such a small amount that it does not completely cover the surface of the silica fine particle base. Meanwhile, Sn can be decreased by surface-treating the silica fine particles to reduce the number of silanol groups on the surface of the silica fine particles, or by treating the silica fine particles with a surface treatment agent having no silanol groups. It is also effective to extend the reaction time or raise the temperature during the surface treatment.

In addition, it is necessary to control the surface treatment state ((D/S)/B, D1/D) of the silica fine particles as the control of the Si—OR groups. The surface treatment state of silica fine particles is calculated by a solid-state $^{29}$Si-NMR DD/MAS method. In the DD/MAS measurement method, since all Si atoms in the measurement sample are observed, quantitative information on the chemical bonding state of Si atoms in the silica fine particles can be obtained.

Generally, in solid-state $^{29}$Si-NMR, to a Si atom in a solid sample, four types of peaks, namely, an M unit (formula (4)), a D unit (formula (5)), a T unit (formula (6)), and a Q unit (formula (7)), can be observed.

M unit: $(R_i)(R_j)(R_k)SiO_{1/2}$ Formula (4)

D unit: $(R_g)(R_h)Si(O_{1/2})_2$ Formula (5)

T unit: $R_mSi(O_{1/2})_3$ Formula (6)

Q unit: $Si(O_{1/2})_4$ Formula (7)

$R_i$, $R_j$, $R_k$, $R_g$, $R_h$, and $R_m$ in the formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

When silica fine particles are measured by DD/MAS, the Q unit indicates a peak corresponding to Si atoms in the silica fine particle base before surface treatment. In the present disclosure, when a silica fine particle is surface-treated with a surface treatment agent such as silicone oil, the silica fine particle is assumed to include the portion derived from the surface treatment agent. In addition, a silica fine particle before being surface-treated is also referred to as a silica fine particle base. The BET specific surface area of the silica fine particles after the surface treatment is denoted by B ($m^2/g$). The M unit, D unit, and T unit each show a peak corresponding to the structure of the surface treatment agent for silica fine particles represented by the above formulas (4) to (6).

Each can be identified by the chemical shift value of the solid-state $^{29}$Si-NMR spectrum, the chemical shift being from −130 ppm to −85 ppm for the Q unit, from −65 ppm to −51 ppm for the T unit, from −25 ppm to −15 ppm for the D unit, and from 10 to 25 ppm for the M unit, and each unit can be quantified by a respective integrated value. The respective peak integrated values are denoted by Q, T, D, and M, and the sum of these integrated values is denoted by S.

The area of the peak for which the peak top is present in a range from −25 ppm to −15 ppm in the chemical shift obtained by a solid-state $^{29}$Si-NMR DD/MAS method of the silica fine particles is denoted by D, and the sum of the peak areas of an M unit, a D unit, a T unit, and a Q unit present in a range from −140 ppm to 100 ppm is denoted by S. The specific surface area of the silica fine particles is denoted by B ($m^2/g$). At this time, a value (D/S)/B (hereinafter also referred to as DSB) of the ratio of (D/S) to B is from $5.7\times10^{-4}$ to $4.9\times10^{-3}$.

In addition, (D/S)/B measured after washing the silica fine particles with chloroform (hereinafter also referred to as DSB-W) is from $1.7\times10^{-4}$ to $4.9\times10^{-3}$.

DSB means the amount of Si atoms per unit surface area that constitute the D unit with respect to the amount of Si atoms in the entire silica fine particle. Here, it is indicated that a silica fine particle for which the fragment represented by the formula (1) is observed in TOF-SIMS and which has a peak at the D unit in the solid-state $^{29}$Si-NMR measurement has been surface-treated by a compound having a dimethylsiloxane structure.

In other words, DSB represents the amount of dimethylsiloxane on the silica fine particle surface per unit surface area. The smaller the DSB, the smaller the amount of dimethylsiloxane on the silica fine particle surface, and although such particles, as an external additive, do not hinder flowability, since silanol groups tend to remain on the silica fine particle base surface, the effect of moisture in an environment with a relatively high humidity cannot be suppressed, and therefore, the moisture is easily adsorbed in a high-temperature and high-humidity environment.

Conversely, the larger the DSB, the greater the amount of dimethylsiloxane on the silica fine particle surface, but where the amount of D units is excessive, the silica fine particles, as an external additive, inhibit flowability. In addition, since silanol groups remain on the surface of the silica fine particle base depending on the state of the dimethylsiloxane treatment, the silanol groups on the surface of the silica fine particle base, which tend to adsorb moisture, increase the liquid-bridging force.

Specifically, where DSB is less than $5.7\times10^{-4}$, the surface treatment of the silica fine particles is not sufficient, and the liquid-bridging force increases in a high-temperature and high-humidity environment. Meanwhile, where the DSB range exceeds $4.9\times10^{-3}$, the amount of dimethylsiloxane becomes excessive and the flowability of the toner is remarkably lowered, resulting in occurrence of transfer unevenness. DSB is preferably from $5.7\times10^{-4}$ to $4.9\times10^{-3}$, more preferably from $7.1\times10^{-4}$ to $4.9\times10^{-3}$.

DSB can be increased by increasing the amount of the surface treatment agent during the surface treatment of the silica fine particle base or by selecting a compound having many D units such as polydimethylsiloxane or a cyclic siloxane as the surface treatment agent. Meanwhile, DSB can be reduced by reducing the amount of the surface treatment agent during the surface treatment of the silica fine particle base or by selecting a compound having no D unit such as hexamethyldisiloxane as the surface treatment agent.

DSB-W is discussed hereinbelow. As described above, DSB-W is DSB after washing silica fine particles with chloroform. This value represents the amount of silicon atoms of D units chemically bonded to the silica fine particles.

Where DSB-W is less than $1.7\times10^{-4}$, the amount of the surface treatment agent bonded to the silica fine particle surface is insufficient, and the surface treatment agent on the silica fine particles is, for example, peeled off during long-term use, resulting in an increase in the liquid-bridging force in a high-temperature and high-humidity environment. Where DSB-W exceeds $4.9\times10^{-3}$, the flowability is remarkably decreased, resulting in occurrence of transfer unevenness.

DSB-W is preferably from $4.9\times10^{-4}$ to $4.9\times10^{-3}$, more preferably from $6.0\times10^{-4}$ to $3.3\times10^{-3}$($33\times10^{-4}$).

Therefore, the silica fine particles are surface-treated with an adequate amount of D units, and the amount of silanol on the surface of the silica fine particles is controlled within an adequate range.

In addition, the terminal polar group (Si—OR group) of the structure derived from the surface treatment agent of the silica fine particles is defined as D1. D1 corresponds to a peak having a peak top in the range of more than −19 ppm to not more than −17 ppm in the chemical shift obtained by solid-state $^{29}$Si-NMR described hereinbelow. In silica fine particles treated with D units, D1 means a Si—OR group (more specifically —Si($R_2$)—OR; R is a methyl group, an ethyl group, or a hydrogen atom.) at the end of the D unit.

As a result of intensive studies conducted by the present inventors, it was found that an increase in the liquid-bridging force between the toner and the photosensitive drum can be suppressed and transfer unevenness can be suppressed in a high-temperature and high-humidity environment with respect to a toner particle with a controlled amount of a polyvalent metal element by providing silica fine particles, which have adequate amounts of D units and silanol, with an appropriate amount of D1.

The inventors assumed the following regarding the effect of D1. Due to the polarization of D1 at the D unit end, which is moderately hydrophobic, the oxygen atom in the Si—OR group has a negative charge δ−. By coordinating the oxygen atom to the polyvalent metal element on the toner particle surface, adsorption of moisture on the toner particle surface under a high-temperature and high-humidity environment is suppressed, and an increase in the liquid-bridging force is suppressed.

In addition, compared with a polar group such as a silanol group in the Q unit present on the surface of the silica fine particle base, the polar group of D1 at the end of the D unit has moderately high hydrophobicity. It is considered that this is influenced by the polarity of the oxygen atom bonded to the Si to which the polar group is bonded. In addition, as represented by DSB-W, the D unit is bonded to the silica fine particle base to some extent, and D1 at the end of the D unit is located away from the surface of the silica fine particle base. As described above, since D1 at the end of the D unit is more hydrophobic than the silanol group present on the surface of the silica fine particle base, the effect of moisture on the silica fine particles is low.

Therefore, the surface of the silica fine particles is treated with a treatment agent having D units, the amount of silanol groups on the silica fine particle surface is controlled to an adequate amount, and a certain amount of D1 is introduced at the end of the D units. That is, by setting the amount Sn of the silanol groups, DSB, DSB-W, and D1/D on the silica fine particles to appropriate ranges, it is possible to suppress moisture adsorption on the toner surface and suppress an increase in the liquid-bridging force even in a high-temperature and high-humidity environment. Furthermore, it is considered that the appropriate flowability of the toner ensures uniformity of the image on the drum and the transfer pressure applied to the toner, thereby making it possible to suppress the transfer unevenness, which is a local decrease in transfer efficiency.

Therefore, the area of a peak having a peak top present in the range of more than −19 ppm and not more than −17 ppm in the chemical shift obtained by the solid-state $^{29}$Si-NMR DD/MAS of silica fine particles is defined as D1. The value of the ratio (D1/D) of D1 to D is from 0.10 to 0.30.

The D unit peak in solid-state $^{29}$Si-NMR measurement is separated into two, the peak that appears in the range of more than −19 ppm and not more than −17 ppm in the chemical shift is defined as peak D1, and the peak that appears in the range of from −23 ppm to −19 ppm is defined as D2.

It is known that among the D units measured on the silica fine particles, a Si atom bonded to the OR group at the end of the D unit corresponds to the peak D1. Also, it is known that a Si atom in a dimethylsiloxane chain corresponds to the peak D2. That is, it can be determined that the larger the integrated value of the peak D1, the more the terminal OR groups in the D units. That is, D1/D means the amount of OR groups in the D units of the treatment agent. It can be determined that the larger the D1/D, the more the D unit terminal OR groups take part in the treatment.

Where D1/D is less than 0.10, the amount of D1 is small and a sufficient effect of suppressing moisture adsorption with respect to polyvalent metal elements cannot be obtained, so an increase in the liquid-bridging force cannot be suppressed. Meanwhile, where D1/D exceeds 0.30, the amount of D1 is too large, so that the D1 structure itself absorbs moisture, and the liquid-bridging force increases. D1/D is more preferably from 0.10 to 0.25, more preferably from 0.18 to 0.22.

Since D1/D is derived from the structure of the treatment agent that is used to treat the surface of the silica fine particles, D1/D can be controlled by the type, amount added, and reaction conditions of the treatment agent. For example, it is preferable to use a treatment agent having many D1 structures, or to use a cyclic siloxane, such as octamethyltetrasiloxane, that opens a ring to react with the silica fine particle surface, or a low-molecular-weight polydimethylsiloxane.

In addition, D1/D can be increased by setting the reaction conditions (temperature, time) of the surface treatment agent to generate Si—OH. Meanwhile, D1/D can be reduced by using a treatment agent that does not have the D1 structure and treating under conditions such that the D1 structure does not appear. For example, there are methods such as treatment with hexamethyldisilazane and physical adhesion of polydimethylsiloxane.

At least one polyvalent metal element selected from the group consisting of calcium, magnesium, aluminum, and iron needs to be present on the surface of the toner particle. The total content of the polyvalent metal element measured by a method described in a measurement method (a) to (c) hereinbelow is from 1 ppm by mass to 2000 ppm by mass.

Measurement Method (a) The polyvalent metal element on the surface of the toner particle is extracted by stirring 50.0 mg of the toner particles with 5.00 g of 6.0 mol/L nitric acid aqueous solution to obtain an extract.

(b) The extract obtained by extracting the polyvalent metal element is filtered to prepare a measurement sample.

(c) The measurement sample is measured with an inductively coupled plasma mass spectrometer to determine the content of the polyvalent metal element based on the mass of the measurement sample.

According to the procedure (a) in the measurement method, the polyvalent metal present on the toner particle surface migrates to the nitric acid aqueous solution. Therefore, the degree of presence of the polyvalent metal on the surface of the toner particles can be known by the above measuring method.

When the content of the polyvalent metal element is 1 ppm by mass or more, it can be determined that the polyvalent metal element is present on the surface of the toner particle.

By setting the content of the polyvalent metal element within the above range, it is possible to suppress the generation of transfer dust by suppressing the charge increase of the toner in a low-temperature and low-humidity environment. Further, in a high-temperature and high-humidity environment, it is possible to suppress a decrease in graininess in halftones by suppressing a decrease in toner charge quantity. In addition, since the moderately hydrophobic Si—OR groups, which are present on the silica fine particles, are coordinated with the polyvalent metal element on the toner surface, moisture adsorption can be suppressed. Therefore, it is possible to suppress an increase in the liquid-bridging force between the toner and the photosensitive drum and to suppress the occurrence of transfer unevenness in a high-temperature and high-humidity environment.

The total content of the polyvalent metal element is preferably from 5 ppm by mass to 500 ppm by mass, more preferably from 10 ppm by mass to 100 ppm by mass, and even more preferably from 20 ppm by mass to 60 ppm by mass.

The content of the polyvalent metal element can be controlled by the amount of the polyvalent metal element added during the production of the toner particle and the pH of the toner particle dispersion liquid. Moreover, where these polyvalent metal compounds are externally added, they are removed by washing before measurement.

When the polyvalent metal element includes calcium, the content of calcium measured by the method described in the measurement method (a) to (c) is preferably from 1 ppm by mass to 200 ppm by mass, more preferably from 3 ppm by mass to 10 ppm by mass.

When the polyvalent metal element includes magnesium, the content of magnesium measured by the method described in the measurement method (a) to (c) is preferably from 2 ppm by mass to 400 mass ppm, more preferably from 10 ppm by mass to 30 ppm by mass.

When the polyvalent metal element includes aluminum, the content of aluminum measured by the method described in the measurement method (a) to (c) is preferably from 5 ppm by mass to 1000 ppm by mass, more preferably from 10 ppm by mass to 100 ppm by mass, even more preferably from 20 pp m by mass to 60 ppm by mass, and still more preferably from 30 ppm by mass to 50 ppm by mass.

When the polyvalent metal element includes iron, the content of iron measured by the method described in the measurement method (a) to (c) is preferably from 10 ppm by mass to 2000 ppm by mass, more preferably from 200 ppm by mass to 600 ppm by mass.

The reason why the preferred content of polyvalent metal element differs depending on the type of metal element is that the ionization tendency differs depending on the type of metal element. A polyvalent metal element with a low ionization tendency is preferable because such an element is less likely to be stabilized by moisture adsorption and Si—OR group coordination than a polyvalent metal element with a high ionization tendency, so it is possible to contain a larger amount of the polyvalent metal element.

Where the coverage ratio of the surface of the toner particle by the silica fine particles that is calculated from an image of the toner surface observed by a scanning electron microscope (SEM) is denoted by Ssi, the Ssi is preferably from 30% by area to 90% by area.

Where the coverage ratio is 30% by area or more, it is possible to further suppress an increase in the liquid-bridging force, and because of good flowability, the occurrence of transfer unevenness can be further suppressed. The coverage ratio Ssi is more preferably 55% by area or less, and even more preferably 50% by area or less.

Where Ssi is 55% by area or less, separation of the silica fine particles from the toner and burying of the silica fine particles in the toner are suppressed during long-term use, and the occurrence of transfer unevenness can be further suppressed over a long period of time. The lower limit is more preferably 35% by area or more, still more preferably 40% by area or more. The coverage ratio Ssi can be controlled by the amount of silica fine particles added to the toner.

Further, the content of the silica fine particles is preferably from 0.3 parts by mass to 2.0 parts by mass, more preferably from 1.0 part by mass to 1.8 parts by mass, and even more preferably from 1.2 parts by mass to 1.7 parts by mass with respect to 100 parts by mass of the toner particles. As a result of setting the content of the silica fine particles within the above ranges, the toner has more appropriate flowability, the image on the drum is made uniform, and the transfer pressure applied to the toner is made uniform, thereby making it possible to further suppress the transfer unevenness which is a local decrease in transfer efficiency.

In addition, the number-average particle diameter of the primary particles of the silica fine particles is preferably from 5 nm to 50 nm, more preferably from 10 nm to 40 nm, and even more preferably from 20 nm to 30 nm. By externally adding the silica fine particles having the above particle diameter range to the toner particle, charging performance and flowability of the toner are further improved and transfer unevenness, transfer dust, and roughness can be more easily suppressed.

Silica fine particles may also include large-diameter silica fine particles as spacer particles. Due to the large-diameter silica fine particles, it is easy to suppress the embedding of silica fine particles due to stress received inside the developing device, such as stress from the carrier, for example, when the toner is used as a two-component developer, stress from a developing blade and a developing sleeve when the toner is used as a one-component developer, and the like.

That is, silica fine particles preferably contain silica fine particles with a small particle diameter and silica fine particles with a large particle diameter. The number-average particle diameter of the primary particles of the small-diameter silica fine particles is preferably from 5 nm to 25 nm, more preferably from 5 nm to 20 nm. Further, the number-average particle diameter of the primary particles of the large-diameter silica fine particles is preferably more than 25 nm and 70 nm or less, more preferably from 30 nm to 40 nm.

The BET specific surface area of the small-diameter silica fine particle base is preferably from 100 $m^2/g$ to 500 $m^2/g$, more preferably from 150 $m^2/g$ to 300 $m^2/g$. Also, the BET specific surface area of the large-diameter silica fine particle base is preferably from 10 $m^2/g$ to 100 $m^2/g$, more preferably from 30 $m^2/g$ to 80 $m^2/g$.

The mass-based content ratio of the small-diameter silica fine particles and the large-diameter silica fine particles is preferably from 20:1 to 5:1, more preferably from 15:1 to 7:1 (small-diameter silica fine particles:large-diameter silica fine particles).

The BET specific surface area B of the silica fine particles after surface treatment is preferably from 40 $m^2/g$ to 200 $m^2/g$, more preferably from 100 $m^2/g$ to 150 $m^2/g$.

In addition, from the viewpoint of charging uniformity, it is preferable that the small-diameter silica fine particles and the large-diameter silica fine particles be subjected to the same surface treatment. The number-average particle diameter of the silica fine particles can be controlled by the mixing ratio of the small-diameter silica fine particles and the large-diameter silica fine particles.

The silica fine particles are preferably surface-treated with at least a compound represented by the following formula (3).

(3)

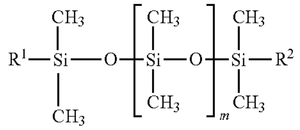

In the formula (3), $R^1$ and $R^2$ are each independently a carbinol group, a hydroxy group, an epoxy group, a carboxy group, an alkyl group (preferably having from 1 to 6 carbon atoms, more preferably from 1 to 3 carbon atoms), or a hydrogen atom. m is the average number of repeating units and is an integer of from 1 to 200 (preferably from 30 to 150, more preferably from 70 to 130).

The surface treatment agent of formula (3) can further suppress the occurrence of transfer unevenness while suppressing moisture adsorption in a high-temperature and high-humidity environment.

The surface treatment agent to be used is not particularly limited as long as it is a compound represented by the formula (3) and known agents can be used. These may be used alone or in combination of two or more. In addition, two or more types of surface treatment agents having different functional groups may be used sequentially or in a mixture, or two or more types of surface treatment agents having the same functional group, but different viscosities and molecular weight distributions may be used sequentially or in a mixture.

The carbon amount immobilization rate (C amount immobilization rate) when the silica fine particles are washed with chloroform is preferably from 30% to 70%, more preferably from 50% to 70%, and even more preferably from 60% to 65%.

The carbon element contained in the silica fine particles is derived from carbon in the surface treatment agent and can be controlled by changing the structure of the surface treatment agent and treatment conditions (treatment temperature, treatment time, viscosity, addition amount, and the like). Here, the immobilization rate based on the amount of C in the surface treatment agent corresponds to the amount of the surface treatment agent chemically bonded to the surface of the silica fine particle base.

The coefficient of friction between the silica fine particles and the members inside the toner cartridge is made adequate by controlling the C amount immobilization rate due to the surface treatment agent in the silica fine particles within the above range. In addition, the amount of silanol groups on the surface of the silica fine particle base is reduced, control of D1/D is facilitated, and moisture adsorption may be easier suppressed. As a result, the durability of the silica fine particles and the toner to which the silica fine particles have been externally added is further improved, and the occurrence of transfer unevenness can be suppressed for a long period of time.

The silica fine particles are preferably hydrophobized silica particles obtained by heat-treating a silica fine particle base together with a cyclic siloxane and then heat-treating with silicone oil. The value of the ratio (X/Y) of the treatment amount X with the cyclic siloxane to the treatment amount Y with the silicone oil is preferably from 0.60 to 1.20, more preferably from 0.60 to 1.10, and even more preferably from 0.70 to 1.00.

By controlling X/Y within the above range, it becomes easier to control the value of D1/D within the target range. X/Y is obtained by the following formula.

$$X/Y = (C \text{ amount of silica fine particles treated with cyclic siloxane: intermediate } C \text{ amount})/\{(C \text{ amount of silica fine particles treated with silicone oil after treatment with cyclic siloxane: final product } C \text{ amount}) - (C \text{ amount of silica fine particles treated with cyclic siloxane: intermediate } C \text{ amount})\}.$$

Silica fine particles obtained by a known method can be used without any particular limitation as the silica fine particle base which is a base material before surface treatment with silicone oil or the like. Typical examples include fumed silica, wet silica, and sol-gel silica. Also, these may be partially or wholly fused silica.

For the silica fine particle base, it is possible to select, as appropriate, and use a suitable one from fumed silica, wet silica, and the like according to the required properties of individual toners. In particular, fumed silica is excellent in the flowability-imparting effect, and is suitable as a silica fine particle base for use as an external additive for electrophotographic toners.

The silica fine particles obtained by surface treatment on the silica fine particle base for the purpose of imparting hydrophobicity and flowability are used. As a surface treatment method, there is a method of chemically treating with a silicon compound that reacts with or physically adsorbs to the silica fine particle base.

The method of surface-treating the silica fine particle base is not particularly limited and can be carried out by bringing a surface treatment agent containing siloxane bonds into contact with the silica fine particles. From the viewpoint of uniformly treating the surface of the silica fine particle base and easily achieving the above physical properties, it is preferable to bring the surface treatment agent into contact with the silica fine particle base in a dry manner. As will be described hereinbelow, a method of contacting the vapor of a surface treatment agent with raw silica fine particles, or a method of spraying an undiluted solution of the surface treatment agent or a solution obtained by diluting with various solvents to bring the solution into contact with the silica fine particle base can be used.

As a method for surface-treating a silica fine particle base, a method for producing silica fine particles is preferable that includes a step of surface-treating (dry treatment) the silica fine particle base with a cyclic siloxane as the first treatment, and a step of surface-treating (dry treatment) the silica fine particle base after the cyclic siloxane treatment with silicone oil as the second treatment. The silica fine particles are preferably obtained by treating silica fine particles with cyclic siloxane and then treating the treatment product with silicone oil. A method for producing a toner preferably includes a step of preparing silica fine particles obtained by the above method.

Regarding the first treatment, high-temperature treatment with a cyclic siloxane having a low molecular weight can efficiently reduce the amount of silanol groups on the surface of the silica fine particle base and also add a short dimethylsiloxane chain having terminal OH groups to the surface of the silica fine particle base.

The temperature for treating the surface of the silica fine particle base with a cyclic siloxane is preferably 300° C. or higher. Where the temperature is 300° C. or higher, the amount of silanol groups on the surface of the silica fine particle base can be effectively reduced. Moreover, where the treatment temperature is 300° C. or higher, siloxane bonds are generated and broken, and the surface of the silica fine particle base can be treated more uniformly while controlling to obtain uniform siloxane chain lengths.

The temperature for treating the surface of the silica fine particle base with a cyclic siloxane is preferably 310° C. or higher, more preferably 320° C. or higher, and even more preferably 330° C. or higher. Although the upper limit is not particularly limited, it is preferably 380° C. or lower, more preferably 350° C. or lower.

After the cyclic siloxane treatment, the silica fine particle base subjected to the cyclic siloxane treatment is heat-treated with silicone oil as the second treatment. The silicone oil bonds with the terminal OH groups of the component obtained by reaction with the cyclic siloxane in the first treatment, and a long-chain dimethylsiloxane component can be introduced onto the silica fine particle surface. The temperature at which the surface of the silica fine particle base is treated with silicone oil is preferably 300° C. or higher, more preferably 320° C. or higher, and even more preferably 330° C. or higher. Although the upper limit is not particularly limited, it is preferably 380° C. or lower, more preferably 350° C. or lower.

By controlling the treatment amount X with the cyclic siloxane and the treatment amount Y with the silicone oil described above, the amount of silanol component on the surface of the silica fine particle base can be reduced, the above-described D unit amount and D1 amount can be controlled, and the charging stability can be improved, without lowering the flowability of the toner, with a small surface treatment amount.

As the cyclic siloxane, at least one selected from the group consisting of low-molecular-weight cyclic siloxanes having rings with up to 10 members, such as hexamethylcyclotrisiloxane, octamethylcyclotetrasiloxane, decamethylcyclopentasiloxane, and the like, can be used. Among them, octamethylcyclotetrasiloxane is preferred.

In addition, silicone oil indicates an oily substance having a molecular structure with a siloxane bond constituting a main chain, and as long as the above-mentioned formula (3) is satisfied, generally available silicone oils can be used without particular limitation.

Specific examples include silicone oils composed of linear polysiloxane skeletons such as dimethyl silicone oil, alkyl-modified silicone oil, olefin-modified silicone oil, fatty acid-modified silicone oil, alkoxy-modified silicone oil, polyether-modified silicone oil, carbinol-modified silicone oil, and the like.

The treatment time in the first treatment and the second treatment varies depending on the treatment temperature and the reactivity of the surface treatment agent used, but is preferably from 5 min to 300 min, more preferably from 30 min to 240 min, and still more preferably from 50 min to 200 min. The treatment temperature and treatment time of the surface treatment within the above ranges are preferable from the viewpoint of sufficiently reacting the treatment agent with the silica fine particle base and from the viewpoint of production efficiency.

The surface treatment agent is brought into contact with the silica fine particle base in the first treatment preferably by a method of contacting the vapor of the surface treatment agent under reduced pressure or in an inactive gas atmosphere such as a nitrogen atmosphere. By using the vapor contact method, the surface treatment agent that does not react with the silica fine particle surface can be easily removed, and the silica fine particle surface can be adequately covered with modifying groups having appropriate polarity. When using the method of contacting the vapor of the surface treatment agent, the treatment is preferably performed at a treatment temperature equal to or higher than the boiling point of the surface treatment agent. The vapor contact may be carried out in multiple batches.

When the vapor of the surface treatment agent is brought into contact in an inactive gas atmosphere such as a nitrogen atmosphere, the pressure (gauge pressure) of the vapor of the surface treatment agent in a container is preferably from 50 kPa to 300 kPa, more preferably from 150 kPa to 250 kPa.

The toner particle may contain a binder resin. Examples of the binder resin include vinyl resins, polyester resins, and the like, but there is no particular limitation and known resins can be used.

Specific examples of vinyl resins include polystyrene and styrenic copolymers such as styrene-propylene copolymer, styrene-vinyl toluene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-octyl methacrylate copolymer, styrene-butadiene copolymer, styrene-isoprene copolymer, styrene-maleic acid copolymer, styrene-maleic acid ester copolymer, and the like, polyacrylic acid esters, polymethacrylic acid esters, polyvinyl acetate, and the like, and these can be used singly or in combination.

Among these, styrenic copolymers and polyester resins are preferred from the viewpoint of developing properties, fixability, and the like, and polyester resins are more preferred.

The binder resin preferably contains a polyester resin, and more preferably contains a polyester resin as a main component from the viewpoint of low-temperature fixability. The main component means that the content thereof is 50% by mass to 100% by mass (preferably 80% by mass to 100% by mass). More preferably, the binder resin is a polyester resin.

Polyhydric alcohols (dihydric, trihydric or higher alcohols), polyvalent carboxylic acids (divalent, trivalent or higher carboxylic acids), acid anhydrides thereof or lower alkyl esters thereof can be used as monomers to be used in the polyester resin.

The following polyhydric alcohol monomers can be used as polyhydric alcohol monomers to be used in the polyester resin.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, bisphenol represented by formula (A) and derivatives thereof;

(A)

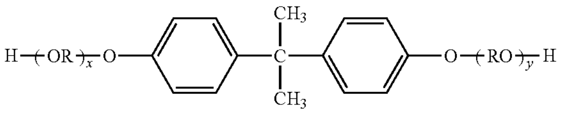

(In the formula, R is an ethylene group or a propylene group, x and y are each an integer of 0 or more, and the average value of x+y is from 0 to 10.)

Diols represented by formula (B).

(B)

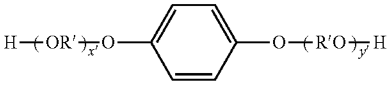

(In the formula, R' is

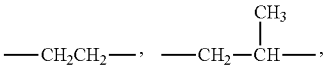

or

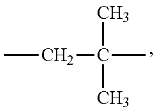

x' and y' are each integers of 0 or more, and the average value of x'+y' is from 0 to 10)

Examples of the trihydric and higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Of these, glycerol, trimethylolpropane, and pentaerythritol are preferably used. These dihydric alcohols and trihydric or higher alcohols can be used alone or in combination.

The following polyvalent carboxylic acid monomers can be used as the polyvalent carboxylic acid monomers to be used in the polyester resin.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecyl succinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Among these, maleic acid, fumaric acid, terephthalic acid, and n-dodecenylsuccinic acid are preferably used.

Examples of trivalent and higher carboxylic acids include, for example, 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, empol trimer acid, acid anhydrides thereof and lower alkyl esters thereof.

Of these, 1,2,4-benzenetricarboxylic acid, that is, trimellitic acid, or derivatives thereof are particularly preferred because the cost is low and reaction control is easy. These divalent carboxylic acids and trivalent or higher carboxylic acids can be used alone or in combination.

A method for producing the polyester resin is not particularly limited and known methods can be used. For example, the abovementioned alcohol monomer and carboxylic acid monomer are loaded at the same time, polymerized through an esterification reaction or a transesterification reaction, and a condensation reaction to produce a polyester resin. Moreover, the polymerization temperature is not particularly limited, but is preferably in the range of from 180° C. to 290° C. Polymerization catalysts such as titanium-based catalysts, tin-based catalysts, zinc acetate, antimony trioxide, and germanium dioxide can be used for the polymerization of the polyester resin. In particular, the binder resin is more preferably a polyester resin polymerized using a tin-based catalyst.

A vinyl-based monomer capable of radical polymerization can be used as a polymerizable monomer that can generate a vinyl resin. A monofunctional monomer or a polyfunctional monomer can be used as the vinyl-based monomer.

Examples of the monofunctional monomer include styrene; styrene derivatives such as α-methylstyrene, β-methylstyrene, o-methylstyrene, m-methylstyrene, p-methylstyrene, p-methoxystyrene, and p-phenylstyrene; acrylic polymerizable monomers such as methyl acrylate, ethyl acrylate, n-propyl acrylate, iso-propyl acrylate, n-butyl acrylate, dibutyl phosphate ethyl acrylate, and 2-benzoyloxyethyl acrylate; methacrylic polymerizable monomers such as methyl methacrylate, ethyl methacrylate, and dibutyl phosphate ethyl methacrylate; methylene aliphatic monocarboxylic acid esters; vinyl esters such as vinyl acetate and vinyl propionate; vinyl ethers such as vinyl methyl ether, vinyl ethyl ether and vinyl isobutyl ether; and vinyl ketones such as vinyl methyl ketone, vinyl hexyl ketone, and vinyl isopropyl ketone.

Preferably, the vinyl resin is a copolymer of a (meth) acrylic acid alkyl ester having an alkyl group having from 1 to 10 (preferably from 1 to 8, more preferably from 2 to 6) carbon atoms and styrene. A copolymer of styrene and n-butyl acrylate is more preferred. (Meth)acrylic acid may be further copolymerized as a monomer that provides an acid group.

The glass transition temperature (Tg) of the toner is preferably from 40° C. to 70° C. When the glass transition temperature of the toner is from 40° C. to 70° C., it is possible to improve storage stability and durability while maintaining good fixing performance.

A charge control agent may be added to the toner particle.

Organometallic complex compounds and chelate compounds are effective as charge control agents for negative charging, and examples thereof include monoazo metal complex compounds; acetylacetone metal complex compounds; metal complex compounds of aromatic hydroxycarboxylic acids or aromatic dicarboxylic acids; and the like.

Specific examples of commercially available products include SPILON BLACK TRH, T-77, T-95 (Hodogaya Chemical Industry Co., Ltd.), BONTRON (registered trademark)S-34, S-44, S-54, E-84, E-88, E-89 (Orient Chemical Industries Co., Ltd.).

Examples of positive-charging charge control agents include nigrosine, modified products with fatty acid metal salts and the like; onium salts such as quaternary ammonium salts such as tributylbenzylammonium-1-hydroxy-4-naphthosulfonate and tetrabutylammonium tetrafluoroborate, and phosphonium salts, which are analogues thereof, and lake pigments thereof; triphenylmethane dyes and lake pigments thereof (examples of laking agents include phosphotungstic acid, phosphomolybdic acid, phosphotungstic molybdic acid, tannic acid, lauric acid, gallic acid, ferricyanic acid, ferrocyanic compounds, and the like); metal salts of higher fatty acids; diorganotin oxides such as dibutyltin oxide, dioctyltin oxide, and dicyclohexyltin oxide; organotin borates such as dicyclohexyltin borate, dibutyltin borate, dioctyltin borate, and dicyclohexyltin borate.

Specific examples of commercially available products include TP-302, TP-415 (Hodogaya Chemical Co., Ltd.), BONTRON (registered trademark)N-01, N-04, N-07, P-51 (Orient Chemical Co., Ltd.), COPY BLUE PR (Clariant).

These charge control agents can be used alone or in combination of two or more. From the viewpoint of charge quantity of the toner, the amount of these charge control agents used is preferably from 0.1 parts by mass to 10.0 parts by mass, more preferably from 0.1 parts by mass to 5.0 parts by mass, per 100 parts by mass of the binder resin.

A release agent may be blended into the toner particle as needed to improve fixing performance. The release agent is not particularly limited, and known release agents can be used.

Specific examples of the release agent include petroleum-based waxes such as paraffin wax, microcrystalline wax, petrolatum and derivatives thereof, montan wax and derivatives thereof, hydrocarbon waxes obtained by the Fischer-Tropsch process and derivatives thereof, polyolefin waxes typified by polyethylene and polypropylene, and derivatives thereof, natural waxes such as carnauba wax, candelilla wax, and the like, and derivatives thereof, ester waxes, and the like. Here, the derivatives include oxides, block copolymers with vinyl-based monomers, and graft-modified products.

As the ester wax, monofunctional ester wax, bifunctional ester wax, and multifunctional ester wax such as tetrafunctional and hexafunctional ester waxes can be used.

The melting point of the release agent is preferably from 60° C. to 140° C., more preferably from 70° C. to 130° C. Where the melting point is from 60° C. to 140° C., the toner is easily plasticized at the time of fixing, and the fixing performance is improved. In addition, it is preferable that outmigration of the release agent hardly occurs even after long-term storage.

The toner particle may contain a colorant. Examples of the colorant include organic pigments, organic dyes, inorganic pigments, and the like, but there is no particular limitation and known colorants can be used.

Examples of cyan colorants include copper phthalocyanine compounds and derivatives thereof, anthraquinone compounds, and basic dye lake compounds. Specific examples include C. I. Pigment Blue 1, 7, 15, 15:1, 15:2, 15:3, 15:4, 60, 62, and 66.

The following are examples of magenta colorants. Condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples include the following.

C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254. C. I. Pigment Violet 19.

Examples of yellow colorants include condensed azo compounds, isoindolinone compounds, anthraquinone compounds, azo metal complexes, methine compounds, and allylamide compounds. Specific examples include the following.

C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include carbon black, and those toned black using the above-mentioned yellow colorants, magenta colorants, and cyan colorants.

These colorants can be used singly or in a mixture and further in the form of a solid solution. Colorants used in the present invention are selected from the viewpoint of hue angle, chroma, lightness, lightfastness, OHP transparency, and dispersibility in toner particle.

The amount of the colorant to be added is preferably from 1 part by mass to 20 parts by mass with respect to 100 parts by mass of the binder resin or the polymerizable monomers constituting the binder resin.

The toner particles are preferably non-magnetic toner containing no magnetic bodies. In the case of a non-magnetic toner, charge decay is less likely to occur even when a strong voltage is applied in the transfer process, so a decrease in graininess in halftones can be suppressed in a high-temperature and high-humidity environment.

In addition to silica fine particles, the toner may contain other external additives such as inorganic fine particles other than silica fine particles. The toner can be obtained by externally adding silica fine particles and, if necessary, inorganic fine particles other than silica fine particles as an external additive to toner particles. Examples of inorganic fine particles include strontium titanate, fatty acid metal salts, alumina, and metal oxide fine particles (inorganic fine particles) such as titanium oxide, hydrotalcite compounds, zinc oxide fine particles, cerium oxide fine particles and calcium carbonate fine particles.

Further, as other external additives, composite oxide fine particles using two or more kinds of metals can be used, or two or more kinds selected in arbitrary combination from these fine particle groups can be used. In addition, resin fine particles and organic-inorganic composite fine particles of resin fine particles and inorganic fine particles can also be used. These other external additives may be hydrophobized with a hydrophobizing agent.

Examples of hydrophobizing agents include chlorosilanes such as methyltrichlorosilane, dimethyldichlorosilane, trimethylchlorosilane, phenyltrichlorosilane, diphenyldichlorosilane, t-butyldimethylchlorosilane, vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and the like;

silazanes such as hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like;

silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, terminally reactive silicone oil, and the like;

siloxanes such as hexamethylcyclotrisiloxane, octamethylcyclotetrasiloxane, decamethylcyclopentasiloxane, hexamethyldisiloxane, octamethyltrisiloxane, and the like; and fatty acids and metal salts thereof, such as long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, arachidonic acid, and the like, and salts of these fatty acids with metals such as zinc, iron, magnesium, aluminum, calcium, sodium, lithium, and the like.

Among these, alkoxysilanes, silazanes, and silicone oils are preferably used because the hydrophobizing treatment may be easily performed. One of these hydrophobizing agents may be used alone, or two or more thereof may be used in combination.

The content of other external additives is preferably from 0.05 parts by mass to 20.0 parts by mass with respect to 100 parts by mass of toner particles.

The weight-average particle diameter (D4) of the toner is preferably from 3.0 μm to 12.0 μm, more preferably from 4.0 μm to 10.0 μm. Where the weight-average particle diameter (D4) is within the above range, good flowability can be obtained, and the latent image can be developed faithfully.

A method for producing the toner is not particularly limited and known methods can be adopted. For example, a kneading pulverization method and a wet production method can be used. A wet production method is preferable from the viewpoint of uniformity of particle diameter and shape control. Examples of the wet production method include a suspension polymerization method, a dissolution suspension method, an emulsion polymerization aggregation method, an emulsion aggregation method, and the like, and an emulsion aggregation method is more preferable.

That is, it is preferable that the method for producing toner particles include at least a step of aggregating fine particles of a binder resin to form aggregated particles and a step of fusing the aggregated particles to obtain toner particles. Also, the toner particles are preferably emulsion aggregation toner particles. This is because polyvalent metal elements are easily ionized in the aqueous medium, and polyvalent metal elements are easily introduced in the toner particle when the binder resin is aggregated.

A method for producing toner particles by emulsion aggregation will be described in detail below.

Dispersion Liquid Preparation Step

A binder resin particle dispersion liquid is prepared, for example, as follows. Where the binder resin is a homopolymer or copolymer of a vinyl-based monomer (vinyl resin), the vinyl-based monomer is subjected to emulsion polymerization or seed polymerization in an ionic surfactant to prepare a liquid dispersion in which particles of the vinyl resin are dispersed in the ionic surfactant.

Where the binder resin is a resin other than a vinyl resin, such as a polyester resin, the resin is mixed with an aqueous medium in which an ionic surfactant or a polymer electrolyte is dissolved.

Thereafter, this solution is heated to a temperature equal to or higher than the melting point or softening point of the resin to dissolve the resin, and a dispersing machine having a strong shearing force, such as a homogenizer, is used to prepare a dispersion liquid in which the binder resin particles are dispersed in an ionic surfactant.

The dispersing means is not particularly limited, and examples thereof include a rotary shearing homogenizer, a ball mill having media, a sand mill, a dyno mill, and other dispersing devices known per se.

A phase inversion emulsification method may also be used as a method for preparing a dispersion liquid. The phase inversion emulsification method is a method for obtaining an emulsified liquid in which a binder resin is dissolved in an organic solvent, a neutralizer or a dispersion stabilizer is added as necessary, an aqueous solvent is added dropwise under stirring to obtain emulsified particles, and the organic solvent contained in the resin dispersion liquid is thereafter removed. At this time, the order of adding the neutralizing agent and the dispersion stabilizer may be changed.

The number-average particle diameter of the binder resin particles is usually 1 μm or less, preferably from 0.01 μm to 1.00 μm. Where the number-average particle diameter is 1.00 μm or less, the particle size distribution of the finally obtained toner is suitable, and the generation of free particles can be suppressed. Further, when the number-average particle diameter is within the above range, uneven distribution among toner particles is reduced, dispersion in the toner is improved, and variations in performance and reliability are reduced.

In the emulsion aggregation method, if necessary, a colorant particle dispersion liquid can be used. The colorant particle dispersion liquid is obtained by dispersing at least colorant particles in a dispersing agent. The number-average particle diameter of the colorant particles is preferably 0.5 μm or less, more preferably 0.2 μm or less. Where the number-average particle diameter is 0.5 μm or less, diffused reflection of visible light can be prevented, and the binder resin particles and the colorant particles are easily aggregated in the aggregation step. Where the number-average particle diameter is within the above range, uneven distribution among toner particles is reduced, dispersion in the toner is improved, and variations in performance and reliability are reduced.

In the emulsion aggregation method, a wax particle dispersion liquid can be used as needed. The wax particle dispersion liquid is obtained by dispersing at least wax particles in a dispersing agent. The number-average particle diameter of the wax particles is preferably 2.0 μm or less, more preferably 1.0 μm or less. When the number-average particle diameter is 2.0 μm or less, the wax content is distributed more evenly among the toner particles, and the long-term image stability is improved. Where the number-average particle diameter is within the above range, uneven distribution among toner particles is reduced, dispersion in the toner is improved, and variations in performance and reliability are reduced.

The combination of colorant particles, binder resin particles and wax particles is not particularly limited and can be freely selected according to the purpose.

In addition to the above dispersion liquids, other particle dispersion liquids obtained by dispersing appropriately selected particles in a dispersing agent may be further mixed.

The particles contained in the other particle dispersion liquids are not particularly limited and can be selected, as appropriate, according to the purpose. Examples thereof include internal addition particles, charge control agent particles, inorganic particles, and abrasive particles. These particles may be dispersed in the binder resin particle dispersion liquid or the colorant particle dispersion liquid.

Examples of dispersing agents to be contained, as necessary, in the binder resin particle dispersion liquid, colorant particle dispersion liquid, wax micro-dispersion liquid, and other particle dispersion liquids include aqueous media containing polar surfactants. Examples of the aqueous medium include water such as distilled water and ion-exchanged water, and alcohols. These may be used individually by one type, or two or more types may be used together. The content of the polar surfactant cannot be generally defined, and can be selected, as appropriate, according to the purpose.

Examples of polar surfactants include anionic surfactants based on sulfuric acid esters and salts, sulfonic acid salts, phosphoric acid esters, and soaps; cationic surfactants such as amine salt-type and quaternary ammonium salt-type surfactants, and the like.

Specific examples of anionic surfactants include sodium dodecylbenzenesulfonate, sodium dodecyl sulfate, sodium alkylnaphthalenesulfonates, and sodium dialkylsulfosuccinates.

Specific examples of cationic surfactants include alkylbenzenedimethylammonium chlorides, alkyltrimethylammonium chlorides, and distearylammonium chloride. These may be used individually by one type, or two or more types may be used together.

These polar surfactants and non-polar surfactants can also be used in combination. Nonpolar surfactants include, for example, nonionic surfactants based on polyethylene glycol, alkylphenol ethylene oxide adducts, polyhydric alcohols, and the like.

The content of the colorant particles is preferably from 0.1 parts by mass to 30 parts by mass with respect to 100 parts by mass of the binder resin in the aggregated particle dispersion liquid when the aggregated particles are formed.

The content of the wax particles is preferably from 0.5 parts by mass to 25 parts by mass, more preferably from 5 parts by mass to 20 parts by mass, with respect to 100 parts by mass of the binder resin in the aggregated particle dispersion liquid when the aggregated particles are formed.

Furthermore, charge control particles and binder resin particles may be added after the aggregated particles are formed in order to control the charging performance of the resulting toner in more detail.

The particle diameter measurement of particles such as binder resin particles and colorant particles is performed using a laser diffraction/scattering particle size distribution analyzer LA-960V2 manufactured by Horiba, Ltd.

Aggregation Step

In the aggregation step of forming aggregated particles, the aggregated particles including binder resin particles as well as colorant particles, wax particles, and the like that are optionally added are formed in an aqueous medium including the binder resin particles and optionally the colorant particles, wax particles, and the like.

The aggregated particles can be formed in an aqueous medium by, for example, adding a flocculant, a pH adjuster, and a stabilizer to the aqueous medium, mixing, and applying, as appropriate, temperature, mechanical power, and the like.

Examples of the flocculant include salts of monovalent metals such as sodium, potassium, and the like; salts of divalent metals such as calcium, magnesium, and the like; salts of trivalent metals such as iron, aluminum, and the like; and alcohols such as methanol, ethanol, propanol, and the like. A flocculant containing a metal element with a valence of 2 or more, which has a high aggregation force and which is capable of aggregating when added in a small amount, is preferred.

Specific examples include inorganic salts of divalent metals such as calcium chloride, calcium nitrate, magnesium chloride, magnesium sulfate, and zinc chloride. Other examples include salts of trivalent metals such as iron (III) chloride, iron (III) sulfate, aluminum sulfate, and aluminum chloride. Other examples include, but are not limited to, inorganic metal salt polymers such as polyaluminum chloride, polyaluminum hydroxide, polyferric sulfate, and calcium polysulfide. These may be used individually by one type, or two or more types may be used together.

By selecting a metal salt as a flocculant, the amount of polyvalent metal elements on the toner particle surface can be controlled by the type and amount of the flocculant added.

Examples of the pH adjuster include alkalis such as ammonia, sodium hydroxide, and the like, and acids such as nitric acid, citric acid, and the like.

Examples of the stabilizer mainly include polar surfactants themselves or aqueous media containing the same. For example, when a polar surfactant contained in each particle dispersion liquid is anionic, a cationic stabilizer can be selected.

The flocculant and the like may be added in the form of either dry powder or an aqueous solution dissolved in an aqueous medium, but in order to cause uniform aggregation, it is preferable to add the flocculant in the form of an aqueous solution.

Addition and mixing of the flocculant and the like are preferably carried out at a temperature equal to or below the glass transition temperature of the resin contained in the aqueous medium. When mixing is performed under this temperature condition, aggregation proceeds in a stable state. Mixing can be carried out using, for example, a known mixing device, homogenizer, mixer, or the like.

In addition, in the aggregation step, a coating layer (shell) can be formed by adhering a dispersion liquid including a polyester resin to the surface of the aggregated particles to obtain toner particles having a core/shell structure in which the shell is formed on the core particle surface. The aggregation step may be repeatedly implemented stepwise by dividing it into a plurality of steps.

Fusion Step

In the fusion step, the obtained aggregated particles are fused by heating. In order to prevent melt adhesion between toner particles, a pH adjuster, a polar surfactant, a non-polar surfactant, and the like can be added, as appropriate, prior to the fusion step.

The heating temperature may range from the glass transition temperature of the resin contained in the aggregated particles (the glass transition temperature of the resin with the highest glass transition temperature if there are two or more types of resin) to the decomposition temperature of the resin. Therefore, the heating temperature differs depending on the type of resin of the binder resin particles and cannot be defined uniquely. Generally, the heating temperature is from the glass transition temperature of the resin contained in the aggregated particles to 140° C. The heating can be performed using a known heating device/instrument.

As for the fusion time, where the heating temperature is high, a short time is sufficient, and where the heating temperature is low, a long time is required. That is, the fusion time depends on the heating temperature and cannot be defined uniquely but is generally from 30 min to 10 h.

The toner particles obtained through the above steps are subjected to solid-liquid separation according to a known method, and the toner particles can be collected, and then washed and dried under appropriate conditions.

External Addition Step

A toner can be obtained by adding the silica fine particles to the obtained toner particles. Other external additives may be added as necessary. From the viewpoint of dispersibility of the external additive, the mixing time in the external addition step is preferably from 0.5 min to 10.0 min, more preferably from 1.0 min to 5.0 min.

The method for producing a toner includes a step of obtaining toner particles, a step of preparing silica fine particles, and a step of externally adding the silica fine particles to and mixing with the obtained toner particles to obtain the toner.

Next, methods for measuring each physical property will be described. Method for Calculating DSB, DSB-W, and D1/D by Solid-State $^{29}$Si-NMR DD/MAS Measurement of Silica Fine Particles and Silica Fine Particles Washed with Chloroform Solid-state $^{29}$Si-NMR measurement of silica fine particles and silica fine particles washed with chloroform is performed by separating the silica fine particles from the toner surface. A method for separating the silica fine particles from the toner surface and the solid-state $^{29}$Si-NMR measurement will be described hereinbelow.

Method for Separating Silica Fine Particles from Toner Surface

When the silica fine particles separated from the toner surface are used as a measurement sample, the silica fine particles are separated from the toner in the following procedure.

A total of 1.6 kg of sucrose (manufactured by Kishida Chemical Co., Ltd.) is added to 1 L of ion-exchanged water and dissolved under heating in a hot water bath to prepare a concentrated sucrose solution. A total of 31 g of the concentrated sucrose solution and 6 mL of CONTAMINON N (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) are placed in a centrifugation tube to prepare a dispersion liquid. The toner, 10 g, is added to this dispersion liquid, and lumps of the toner are loosened with a spatula or the like.

The centrifugation tube is set in the "KM Shaker" (model: V. SX) manufactured by Iwaki Sangyo Co., Ltd. and shaken for 20 min at 350 reciprocations per minute. After shaking, the solution is transferred in a swing rotor glass tube (50 mL) and centrifuged under the conditions of 3500 rpm and 30 min in a centrifuge.

In the glass tube after centrifugation, toner particles are present in the uppermost layer, and an inorganic fine particle mixture containing silica fine particles is present in the aqueous solution side of the lower layer. The aqueous solution of the upper layer and the aqueous solution of the lower layer are separated and dried to obtain toner particles from the upper layer side and an inorganic fine particle mixture from the lower layer side. The obtained toner particles are used to measure the content of a polyvalent metal element described hereinbelow. The above centrifugation step is repeated so that the total amount of the inorganic fine particle mixture obtained from the lower layer side is 10 g or more.

Subsequently, 10 g of the resulting inorganic fine particle mixture is added to and dispersed in a dispersion liquid containing 100 mL of ion-exchanged water and 6 mL of CONTAMINON N. The resulting dispersion liquid is transferred to a swing rotor glass tube (50 mL) and centrifuged under the conditions of 3500 rpm and 30 min in a centrifuge.

In the glass tube after centrifugation, the silica fine particles are present in the uppermost layer, and other inorganic fine particles are present in the aqueous solution side of the lower layer. The aqueous solution of the upper layer is collected, centrifugal separation is repeated as necessary, and after sufficient separation, the dispersion liquid is dried and the silica fine particles are collected.

Also, the silica fine particles washed with chloroform are collected by the washing method with chloroform described hereinbelow.

Next, solid-state $^{29}$Si-NMR measurement of the silica fine particles recovered from the toner particles and the silica fine particles washed with chloroform is performed under the following measurement conditions.

DD/MAS Measurement Conditions for Solid-State $^{29}$Si-NMR Measurement

DD/MAS measurement conditions for solid-state $^{29}$Si-NMR measurement are as follows.

Device: JNM-ECX5002 (JEOL RESONANCE)

Temperature: room temperature

Measurement method: DD/MAS method $^{29}$Si 45°

Sample tube: zirconia 3.2 mmφ

Sample: filled in test tube in powder form

Sample rotation speed: 10 kHz

Relaxation delay: 180 s

Scan: 2000

Calibration standard material: DSS (sodium 3-(trimethylsilyl)-1-propanesulfonate)

After the above measurement, a plurality of silane components with different substituents and bonding groups are peak-separated into the following M unit, D unit, T unit, and Q unit by curve fitting from the solid-state $^{29}$Si-NMR spectrum of the silica fine particles and the silica fine particles washed with chloroform.

Curve fitting is performed using JEOL JNM-EX400 software EXcalibur for Windows (registered trademark) version 4.2 (EX series). "1D Pro" is clicked from the menu icon to load the measurement data. Next, "Curve fitting function" is selected from "Command" on the menu bar to perform curve fitting. Curve fitting is performed for each component so that the difference (composite peak difference) between the composite peak obtained by combining the peaks obtained by curve fitting and the peak of the measurement result is minimized.

M unit: $(R_i)(R_j)(R_k)SiO_{1/2}$ Formula (4)

D unit: $(R_g)(R_h)Si(O_{1/2})_2$ Formula (5)

T unit: $R_mSi(O_{1/2})_3$ Formula (6)

Q unit: $Si(O_{1/2})_4$ Formula (7)

$R_i$, $R_j$, $R_k$, $R_g$, $R_h$, and $R_m$ in the formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

Further, for the D unit peak, waveform separation is performed using the Voigt function, and the area of the peak D1 in the range of more than −19 ppm to not more than −17 ppm is calculated.

After peak separation, the integrated value of D units present in the chemical shift range of from −25 to −15 ppm is calculated. Also, the sum S of all the integrated values of M, D, T, and Q units present in the range of from −140 to 100 ppm are calculated, and the ratio D/S is calculated. Also, the ratio D1/D is calculated from the integrated values of the peaks D1 and D obtained by waveform separation. The value DSB of the ratio of (D/S) to B is calculated from B ($m^2/g$), which is the specific surface area of the silica fine particles. Furthermore, after washing the silica fine particles with chloroform as described hereinbelow, similar NMR measurement is performed to calculate the DSB-W after washing.

Washing Silica Fine Particles with Chloroform

A total of 100 mL of chloroform and 1 g of silica fine particles are placed into a centrifuge tube and stirred with a spatula or the like. The tube for centrifugation is set on the KM Shaker and shaken for 20 min at 350 reciprocations per minute. After shaking, the mixture is transferred to a swing rotor glass tube and centrifuged under the conditions of 3500 rpm and 30 min in a centrifuge. The supernatant is discarded, 100 mL of chloroform is added again, and shaking and centrifugation are performed twice. Precipitated silica fine particles are collected and vacuum-dried at 40° C. for 24 h to obtain washed silica fine particles.

Method for Measuring Fragment Ions on Silica Fine Particle Surface by Time-of-Flight Secondary Ion Mass Spectrometry (TOF-SIMS)

TOF-SIMS measurement of silica fine particles is performed using the silica fine particles separated from the toner by the above-described method for separating silica fine particles from the toner surface. TRIFT-IV manufactured by ULVAC-PHI, Inc. is used for fragment ion measurement of silica fine particle surface using TOF-SIMS.

The analysis conditions are as follows.

Sample preparation: silica microparticles are caused to adhere to an indium sheet Primary ion: Au ion.

Accelerating voltage: 30 kV.

Charge neutralization mode: On.

Measurement mode: Positive.

Raster: 200 μm.

Measurement time: 60 s.

Whether fragment ions corresponding to the structure represented by the formula (1) are observed is confirmed from the obtained mass profile of secondary ion mass/secondary ion charge number (m/z). For example, where the surface treatment agent is polydimethylsiloxane or cyclic siloxane, fragment ions are observed at m/z=147, 207, and 221 positions.

Method for Measuring Si—OH Content of Silica Fine Particles

The amount of Si—OH in the silica fine particles can be determined by the following method using the silica fine particles separated from the toner by the method for separating the silica fine particles from the toner surface described above.

A sample liquid 1 is prepared by mixing 25.0 g of ethanol and 75.0 g of a 20% by mass sodium chloride aqueous solution. Further, 2.00 g of silica fine particles are accurately weighed in a glass bottle, and a sample liquid 2 is prepared by adding a solvent obtained by mixing 25.0 g of ethanol and 75.0 g of a 20% by mass sodium chloride aqueous solution. The sample liquid 2 is stirred with a magnetic stirrer for 5 min or longer to disperse the silica fine particles.

Then, the pH change of each of sample liquids 1 and 2 is measured while dropping 0.1 mol/L sodium hydroxide aqueous solution at 0.01 mL/min. The titer (L) of sodium hydroxide aqueous solution when pH 9.0 is reached is recorded. The amount Sn (/$nm^2$) of Si—OH per 1 $nm^2$ can be calculated from the following formula.

$$Sn=\{(a-b)\times c\times NA\}/(d\times e)$$

a: NaOH titer (L) of sample liquid 2.

b: NaOH titer (L) of sample liquid 1.

c: concentration of NaOH solution used for titration (mol/L).

NA: Avogadro's number.

d: mass of silica fine particles (g).

e: BET specific surface area of silica fine particles ($nm^2/g$: converted from the specific surface area ($m^2/g$) obtained below).

Method for Measuring BET Specific Surface Area of Silica Fine Particles

The BET specific surface area of silica fine particles is measured by the following procedure. As a measuring device, "Automatic Specific Surface Area/Pore Size Distribution Measuring Device TriStar 3000 (manufactured by Shimadzu Corporation)", which adopts a gas adsorption method based on a constant volume method as a measuring method, is used. Setting of measurement conditions and analysis of measurement data are performed using the dedicated software "TriStar 3000 Version 4.00" provided with the device. A vacuum pump, a nitrogen gas pipe, and a helium gas pipe are connected to the device. Using nitrogen gas as the adsorption gas, the value calculated by the BET multipoint method is defined as the BET specific surface area.

The BET specific surface area is calculated as follows. First, nitrogen gas is adsorbed on the silica fine particles, and the equilibrium pressure P (Pa) in the sample cell at that time and the nitrogen adsorption amount $V_a(mol\cdot g^{-1})$ of the magnetic bodies are measured. Then, an adsorption isotherm is obtained in which a relative pressure $P_r$, which is the value obtained by dividing the equilibrium pressure P (Pa) in the sample cell by the saturated vapor pressure $P_0$ (Pa) of nitrogen, is plotted against the abscissa, and the nitrogen adsorption amount $V_a(mol\cdot g^{-1})$ is plotted against the ordinate. Next, a monomolecular layer adsorption amount $V_m(mol\cdot g^{-1})$, which is an adsorption amount necessary to form a monomolecular layer on the surface of the silica fine particle, is obtained by using the following BET formula.

$$P_r/V_a(1-P_r)=1/(V_m\times C)+(C-1)\times P_r/(V_m\times C)$$

(Here, C is a BET parameter, which is a variable that varies depending on the type of measurement sample, the type of adsorbed gas, and the adsorption temperature.)

Where $P_r$ is the X-axis and $P_r/V_a(1-P_r)$ is the Y-axis, the BET formula can be interpreted as a straight line with a slope of $(C-1)/(V_m\times C)$ and an intercept of $1/(V_m\times C)$ (this straight line is called a BET plot).

$$\text{Slope of straight line}=(C-1)/(V_m\times C).$$

$$\text{Intercept of straight line}=1/(V_m\times C).$$

By plotting the measured values of P r and the measured values of $P_r/V_a(1-P_r)$ on a graph and drawing a straight line by using the least squares method, the values of slope and intercept of the straight line can be calculated. Using these values, $V_m$ and C can be calculated by solving the simultaneous equations for the slope and the intercept. Further, the BET specific surface area S ($m^2/g$) of the silica fine particles is calculated based on the following formula from the $V_m$ calculated above and the cross-sectional area occupied by the nitrogen molecule (0.162 $nm^2$).

$$S=V_m \times N \times 0.162 \times 10^{-18}$$

(Here, N is Avogadro's number ($mol^{-1}$)).

Specifically, measurements using this device are performed according to the following procedure.

The tare of a well-washed and dried dedicated glass sample cell (stem diameter ⅜ inch, volume 5 mL) is accurately weighed. Then, using a funnel, 0.1 g of silica fine particles is placed into this sample cell. The sample cell containing silica fine particles is set in a "PRETREATMENT DEVICE VACUUM PREP 061 (manufactured by Shimadzu Corporation)" to which a vacuum pump and a nitrogen gas pipe are connected, and vacuum degassing is continued at 23° C. for 10 h.

The vacuum degassing is gradually performed while adjusting a valve so that the silica fine particles are not sucked into the vacuum pump. The pressure inside the cell gradually decreases in the course of degassing and finally reaches 0.4 Pa (about 3 mTorr).

After the vacuum degassing is completed, nitrogen gas is gradually injected to return the inside of the sample cell to atmospheric pressure, and the sample cell is detached from the pretreatment device. The mass of the sample cell is accurately weighed, and the exact mass of the silica fine particles is calculated from the difference from the tare. At this time, the sample cell is covered with a rubber plug during weighing so that the silica fine particles in the sample cell are not contaminated with moisture in the atmosphere.

Next, a dedicated isothermal jacket is attached to the sample cell containing the silica fine particles. A dedicated filler rod is inserted into this sample cell, and the sample cell is set in the analysis port of the device. The isothermal jacket is a cylindrical member with the inner surface made of a porous material and the outer surface made of an impermeable material. The isothermal jacket can suck up liquid nitrogen to a certain level by capillary action.

Next, a free space of the sample cell, including the connecting device is measured. The free space is calculated by measuring the volume of the sample cell by using helium gas at 23° C., then measuring the volume of the sample cell after cooling the sample cell with liquid nitrogen by similarly using helium gas, and converting from the difference in volume. In addition, the saturated vapor pressure $P_0$(Pa) of nitrogen is separately and automatically measured using a $P_0$ tube built into the device.

Next, after the inside of the sample cell is vacuum degassed, the sample cell is cooled with liquid nitrogen while vacuum degassing is continued. Thereafter, nitrogen gas is introduced stepwise into the sample cell to cause the silica fine particles to adsorb nitrogen molecules. At this time, since an adsorption isotherm can be obtained by measuring the equilibrium pressure P (Pa) at any time, this adsorption isotherm is converted into a BET plot.

The points of the relative pressure $P_r$ for collecting data are set to a total of 6 points of 0.05, 0.10, 0.15, 0.20, 0.25, and 0.30. A straight line is drawn on the obtained measurement data by the least squares method, and $V_m$ is calculated from the slope and intercept of the straight line. Further, using this $V_m$ value, the BET specific surface area of the silica fine particles is calculated as described above.

Method for Measuring Content of Polyvalent Metal Element on Surface of Toner Particle The content of a polyvalent metal element on the toner particle surface is measured by a coupled induction plasma mass spectrometer (ICP-MS (manufactured by Agilent Technologies)). Toner particles from which silica fine particles have been removed by the above-described <Method for Separating Silica Fine Particles from Toner Surface> are used.

For pretreatment, a 6.0 mol/L nitric acid aqueous solution is prepared using 60% nitric acid (manufactured by Kanto Kagaku K. K., standard Ultrapur) and ultrapure water. A toner particle-containing solution sample is prepared by adding 5.00 g of 6.0 mol/L nitric acid to 50.0 mg of toner particles and stirring. After allowing to stand for 120 min, filtration is performed using a filter paper having a pore size of 1 μm to prepare a toner cake. Then, 10.00 g of ultrapure water is added as washing water to the toner cake, thereby separating toner particles from the toner particle-containing solution sample. A polyvalent metal element measurement solution sample is prepared by adding ultrapure water to the solution sample, which is the filtrate, so that the total amount becomes 50.00 g.

As a blank solution sample, ultrapure water is added to 5.00 g of a 6.0 mol/L nitric acid aqueous solution to make a total of 50.00 g, solution samples with a known content are prepared for each polyvalent metal element to plot a calibration curve and the amount of metal contained in the polyvalent metal element measurement sample is quantified to measure the content of the polyvalent metal element on the toner particle surface.

Method for Calculating Coverage Ratio Ssi of Surface of Toner Particles by Silica Fine Particles The coverage Ratio Ssi of the toner particle surface by the silica fine particles is calculated from a backscattered electron image acquired by observation with a scanning electron microscope (SEM). A backscattered electron image is also called a "composition image", and the smaller the atomic number, the darker the detected image, and the larger the atomic number, the brighter the detected image. The backscattered electron image of the toner is acquired under the following observation conditions. A method for acquiring a backscattered electron image of the toner and a method for calculating the coverage ratio of the toner particle surface by the silica fine particles are described hereinbelow.

Method for Acquiring Backscattered Electron Image of Toner

Apparatus used: ULTRA PLUS, manufactured by Carl Zeiss Microscopy Co., Ltd.
Accelerating voltage: 1.0 kV.
WD: 2.5 mm.
Aperture size: 30.0 μm.
Detection signal: EsB (energy selective backscattered electron).
EsB Grid: 700V.
Observation magnification: 20,000 times.
Contrast: 63.0±5.0% (reference value).
Brightness: 38.0±5.0% (reference value).
Resolution: 1024×768 pixels.
Pretreatment: toner is sprinkled on carbon tape (no Pt vapor deposition).

Contrast and brightness are set, as appropriate, according to the state of the apparatus used. In addition, the accelerating voltage and EsB Grid are set so as to achieve items such as acquisition of structural information on the outermost surface of the toner, prevention of charge-up of an undeposited sample, and selective detection of high-energy backscattered electrons. For the observation field of view, a portion where the curvature of the toner is small is selected.

Method for Calculating Silica Coverage Ratio of Toner

The silica coverage ratio is acquired by analyzing the backscattered electron image of the toner outermost surface obtained by the above method using image processing software ImageJ (developed by Wayne Rashand). The procedure is shown below.

First, the backscattered electron image to be analyzed is converted to 8-bit from Type in the Image menu. Next, from Filters in the Process menu, the median diameter is set to 2.0 pixels to reduce image noise. Next, the entire backscattered electron image is selected using the Rectangle Tool on the toolbar. Subsequently, Threshold is selected from Adjust in the Image menu, and a luminance threshold (from 85 to 128 (256 gradations)) is specified so that only luminance pixels derived from the silica fine particles in backscattered electrons are selected. Finally, Measure is selected from the Analyze menu, and the value of the area ratio (% by area) of the luminance selected portion in the backscattered electron image is calculated.

The above procedure is performed for 20 fields of view for the toner to be evaluated, and the arithmetic average value is taken as the coverage ratio Ssi of the toner particle surface by the silica fine particles.

Method for Measuring Number-Average Particle Diameter of Silica Fine Particles

The number-average particle diameter of the silica fine particles is measured from a secondary electron image acquired by observing the toner surface with a scanning electron microscope (SEM).

Method for Acquiring Secondary Electron Image of Toner

Apparatus used: ULTRA PLUS, manufactured by Carl Zeiss Microscopy Co., Ltd.

Accelerating voltage: 1.0 kV.

WD: 2.5 mm.

Aperture size: 30.0 μm.

Detection signal: SE2 (secondary electron image).

Observation magnification: 50,000 times.

Resolution: 1024×768 pixels.

Pretreatment: toner is sprinkled on carbon tape (no Pt vapor deposition).

The maximum diameter of 100 primary particles of silica fine particles on the toner particle surface is measured from the resulting secondary electron image, and the average value is taken as the number-average particle diameter of the silica particles.

Method for Measuring C Amount in Silica Fine Particles

The C amount (carbon amount) in silica fine particles which is derived from the hydrophobizing agent is measured using a carbon/sulfur analyzer (trade name: EMIA-320) manufactured by HORIBA.

A total of 0.3 g of silica fine particles as a sample is accurately weighed and put it into a crucible for the carbon/sulfur analyzer. To this, 0.3 g±0.05 g of tin (supplementary item number 9052012500) and 1.5 g±0.1 g of tungsten (supplementary item number 9051104100) are added as combustion improvers. After that, the silica fine particles are heated at 1100° C. in an oxygen atmosphere according to the instruction manual provided with the carbon/sulfur analyzer. As a result, the hydrophobic groups derived from the hydrophobizing agent on the surface of the silica fine particles are thermally decomposed into $CO_2$, and the amount thereof is measured. The C amount (% by mass) contained in the silica fine particles is determined from the obtained amount of $CO_2$.

Calculation of C Amount Immobilization Rate of Silica Fine Particles Washing with Chloroform: Extraction of Non-Immobilized Treatment Agent Silica fine particles separated from the toner by the method for separating silica fine particles from the toner surface described above can be used.

A total of 0.50 g of silica fine particles and 40 mL of chloroform are placed into an Erlenmeyer flask, covered with a lid, and stirred (magnetic stirrer) for 2 h. After that, the stirring is stopped, and the mixture is allowed to stand for 12 h. Then centrifuging is performed, and the entire supernatant is removed. A centrifuge manufactured by Kokusan Corp. (trade name: H-9R) is used, the centrifugation is performed using a Bn1 rotor and a plastic centrifuge tube for the Bn1 rotor and under the conditions of 20° C., 10000 rpm, and 5 min.

The centrifuged silica fine particles are placed into the Erlenmeyer flask again, mL of chloroform is added, a lid is placed, and stirring is performed (magnetic stirrer) for 2 h. After that, the stirring is stopped, and the mixture is allowed to stand for 12 h. Then centrifuging is performed to remove all supernatant. This operation is repeated two more times. Then, the obtained sample is dried at 50° C. for 2 h using a thermostat. Further, chloroform is sufficiently volatilized by reducing the pressure to MPa and drying at 50° C. for 24 h.

Measurement of C Amount

The C amount in the silica fine particles washed with chloroform as described above and the C amount in the silica fine particles before washing with chloroform are measured according to the above "Method for Measuring C Amount in Silica Fine Particles". The C amount immobilization rate of the silica fine particle can be calculated by the following formula.

$$C \text{ amount immobilization rate [\%]}=[(C \text{ amount in silica fine particles treated with chloroform})/(C \text{ amount in silica fine particles before washing with chloroform})]\times 100$$

Method for Measuring Weight-Average Particle Diameter (D4) and Number-Average Particle Diameter (D1) of Toner (Particle)

The weight-average particle diameter (D4) and number-average particle diameter (D1) of the toner (particle) is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner (particle) is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner (particle) is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software. The number-average particle diameter (D1) is the "average diameter" on the analysis/number statistics (arithmetic mean) screen when graph/number % is set using the dedicated software.

EXAMPLES

Although the present invention will be described in more detail below with production examples and examples, these are not intended to limit the present invention in any way. All parts in the following formulations are parts by mass.

Production Example of Silica Fine Particles 1

Untreated dry silica as small-diameter inorganic fine particles (number-average particle diameter of primary particles 15 nm, BET specific surface area 200 $m^2/g$) and untreated dry silica as large-diameter inorganic fine particles (number-average particle diameter of primary particles is 35 nm, BET specific surface area 50 $m^2/g$) were loaded at a mass ratio of 10:1 and heated to 330° C. in a fluidized state created by stirring. The inside of the reactor was replaced with nitrogen gas, the reactor was sealed, and octamethylcyclotetrasiloxane (D4) was sprayed and mixed as a first surface treatment agent by using a spray nozzle until the gauge pressure reached 200 kPa. Thereafter, the reaction was conducted by continuing heating and stirring for 1 h to carry out a coating treatment.

After the treatment, the inside of the reaction system was replaced with a nitrogen atmosphere and heated to 330° C. again. Subsequently, as a second surface treatment agent, 10 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particles 1. Table 1-2 shows the physical properties of the silica fine particles 1.

Production Examples of Silica Fine Particles 2 to 6

Silica fine particles 2 to 6 were obtained in the same manner as in the production example of silica fine particles 1, except that the reaction time of the first surface treatment agent and the number of parts of the second surface treatment agent were changed as shown in Table 1-2.

Regarding the structure of the second treatment component in Table 1-1, the structure of the substituent of the compound represented by the formula (3) is shown.

Production Example of Silica Fine Particles 7

Silica fine particles 7 were obtained in the same manner as in the production example of silica fine particles 1, except that untreated dry silica as small-diameter inorganic fine particles (number-average particle diameter of primary particles 15 nm, BET specific surface area 200 $m^2/g$) and untreated dry silica as large-diameter inorganic fine particles (number-average particle diameter of primary particles 35 nm, BET specific surface area 50 $m^2/g$) were loaded at a mass ratio of 6:1. Table 1-2 shows the physical properties of the silica fine particles 7.

Production Example of Silica Fine Particles 8

Silica fine particles 8 were obtained in the same manner as in the production example of silica fine particles 1, except that only untreated dry silica (number-average particle diameter of primary particles 15 nm, BET specific surface area 200 $m^2/g$) was loaded as inorganic fine particles. Table 1-2 shows the physical properties of the silica fine particles 8.

Production Examples of Silica Fine Particles 9 to 14

Silica fine particles 9 to 14 were obtained in the same manner as in the production example of silica fine particles 1, except that a double terminal carbinol modified silicone oil (KF-6002, manufactured by Shin-Etsu Chemical Co., Ltd.) was used as the second surface treatment agent, and the BET specific surface area of the loaded untreated dry silica, the reaction time of the first surface treatment agent, and the number of parts of the second surface treatment agent were changed as shown in Table 1-1. Table 1-2 shows the physical properties of the silica fine particles 9 to 14.

Production Example of Silica Fine Particles 15

Untreated dry silica (number-average particle diameter of primary particles 15 nm, BET specific surface area 200 $m^2/g$) was loaded as inorganic fine particles and heated to 290° C. in a fluidized state created by stirring. The inside of the reactor was replaced with nitrogen gas, the reactor was sealed, and octamethylcyclotetrasiloxane was sprayed and mixed as the first surface treatment agent by using a spray nozzle until the gauge pressure reached 100 kPa. Thereafter, the reaction was conducted by continuing heating and stirring for 1 h to carry out a coating treatment.

After the treatment, the inside of the reaction system was replaced with a nitrogen atmosphere and heated to 290° C. again. Subsequently, as the second surface treatment agent, 15 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particles 15. Table 1-2 shows the physical properties of the silica fine particles 15.

Production Example of Silica Fine Particles 16

Untreated dry silica (number-average particle diameter of primary particles 15 nm, BET specific surface area 200 $m^2/g$) was loaded as inorganic fine particles and heated to 250° C. in a fluidized state created by stirring. The inside of the reactor was replaced with nitrogen gas, the reactor was sealed, and octamethylcyclotetrasiloxane was sprayed and mixed as a first surface treatment agent by using a spray nozzle until the gauge pressure reached 100 kPa. Thereafter, the reaction was conducted by continuing heating and stirring for 1 h to carry out a coating treatment and obtain silica fine particles 16. Table 1-2 shows the physical properties of the silica fine particles 16.

Production Example of Silica Fine Particles 17

Untreated dry silica (number-average particle diameter of primary particles 15 nm, BET specific surface area 200 $m^2/g$) was loaded as inorganic fine particles and heated to 250° C. in a fluidized state created by stirring. The inside of the reactor was replaced with nitrogen gas, the reactor was sealed, 30 parts of dimethyl silicone oil (KF-96-50CS, manufactured by Shin-Etsu Chemical Co., Ltd.) was sprayed on 100 parts of untreated dry silica while continuing stirring and keeping the temperature to maintain the fluidized state of silica, and the coating treatment was carried out for 1 h to obtain silica fine particles 17. Table 1-2 shows the physical properties of the silica fine particles 17.

Production Example of Silica Fine Particles 18 and 19

Silica fine particles 18 and 19 were obtained in the same manner as in the production example of silica fine particles 17, except that the number of parts of dimethyl silicone oil and the treatment temperature were changed as shown in Table 1-1. Table 1-2 shows the physical properties of the silica fine particles 18 and 19.

Production Example of Silica Fine Particles 20

Untreated dry silica (number-average particle diameter of primary particles 15 nm, BET specific surface area 200 $m^2/g$) was loaded as inorganic fine particles and heated to 250° C. in a fluidized state created by stirring. The inside of the reactor was replaced with nitrogen gas, the reactor was sealed, and 25 parts of hexamethyldisilazane was sprayed as the first surface treatment agent onto 100 parts of untreated dry silica by using a spray nozzle. Thereafter, the reaction was conducted by continuing heating and stirring for 1 h to carry out a coating treatment. After the treatment, the inside of the reaction system was replaced with a nitrogen atmosphere and heated to 250° C. again.

Subsequently, 10 parts of dimethyl silicone oil (KF-96-50CS, manufactured by Shin-Etsu Chemical Co., Ltd.) was sprayed as the second surface treatment agent, and then the coating treatment was similarly carried out for 1 h to obtain silica fine particles 20. Table 1-2 shows the physical properties of the silica fine particles 20.

Production Example of Silica Fine Particles 21

Untreated dry silica (number-average particle diameter of primary particles 15 nm, BET specific surface area 200 $m^2/g$) was loaded as inorganic fine particles and heated to 250° C. in a fluidized state created by stirring. The inside of the reactor was replaced with nitrogen gas, the reactor was sealed, and 25 parts of hexamethyldisilazane was sprayed as the first surface treatment agent onto 100 parts of untreated dry silica by using a spray nozzle. Thereafter, the reaction was conducted by continuing heating and stirring for 1 h to carry out a coating treatment and obtain silica fine particles 21. Table 1-2 shows the physical properties of the silica fine particles 21.

Production Example of Polyester Resin 1

A total of 47 mol parts of terephthalic acid, 3 mol parts of isophthalic acid, 26 mol parts of ethylene oxide-modified bisphenol A (2 mol adduct), 18 mol parts of ethylene glycol and 1000 ppm of tetrabutoxytitanium (as a concentration based on the mass of the entire monomer mixture) were loaded into a reactor equipped with a stirrer, a thermometer, and an outflow cooler, and an esterification reaction was carried out at 190° C. After that, 6 mol parts of trimellitic anhydride (TMA) was added, the temperature was raised to 220° C., the pressure inside the system was gradually reduced, and the polycondensation reaction was carried out at 150 Pa to produce a polyester resin 1 (Mw: 38,000, softening point 118° C.).

Preparation of Resin Particle Dispersion Liquid 1

A total of 100.0 parts of the polyester resin 1 and 350 parts of ion-exchanged water were loaded in a stainless steel container, the resin was melted by heating to 95° C. in a hot bath, and 0.1 mol/L sodium bicarbonate was added to raise the pH above 7.0 while thoroughly stirring at 7800 rpm using a homogenizer (ULTRA TURRAX T50, manufactured by IKA).

After that, a mixed solution of 3 parts of sodium dodecylbenzenesulfonate and 300 parts of ion-exchanged water was gradually added dropwise to emulsify and disperse, thereby obtaining a polyester resin particle dispersion liquid. The dispersion liquid was cooled to room temperature, and ion-exchanged water was added to obtain a resin particle dispersion liquid 1 having a solid content concentration of 12.5% by mass and a volume based median diameter of 0.2 μm.

Preparation of Resin Particle Dispersion Liquid 2

A total of 78.0 parts of styrene, 20.7 parts of butyl acrylate, 1.3 parts of acrylic acid as a carboxy group-providing monomer, and 3.2 parts of n-lauryl mercaptan were mixed and dissolved. An aqueous solution of 1.5 parts of NEOGEN RK (manufactured by Dai-ichi Kogyo Seiyaku Co., Ltd.) in 150 parts of ion-exchanged water was added to the solution and dispersed.

An aqueous solution of 0.3 parts of potassium persulfate in 10 parts of ion-exchanged water was added while stirring slowly for another 10 min. After purging with nitrogen, emulsion polymerization was carried out at 70° C. for 6 h. After completion of the polymerization, the reaction solution was cooled to room temperature, and ion-exchanged water was added to obtain a resin particle dispersion liquid 2 having a solid content concentration of 12.5% by mass and a volume based median diameter of 0.2 μm.

Preparation of Wax Dispersion Liquid

A total of 100 parts of hydrocarbon wax (melting point: 77° C.) and 15 parts of NEOGEN RK were mixed with 385 parts of ion-exchanged water and dispersed for about 1 h using a wet jet mill JN100 (manufactured by Jokoh Co., Ltd.) to obtain a wax dispersion liquid. The concentration of the wax dispersion liquid was 20% by weight.

Preparation of Colorant Dispersion Liquid 1

C. I. Pigment Blue 15:3 (100 parts) as a colorant and 15 parts of NEOGEN RK were mixed with 885 parts of ion-exchanged water and dispersed for about 1 h using a wet jet mill JN100 to obtain a colorant dispersion liquid 1.

Preparation Example of Toner Particles 1

A total of 265 parts of resin particle dispersion liquid 1, 20 parts of wax dispersion liquid, and 20 parts of colorant dispersion liquid 1 were dispersed using a homogenizer (ULTRA TURRAX T50, manufactured by IKA). The temperature in the container was adjusted to 30° C. while stirring, and a 1 mol/L sodium hydroxide aqueous solution was added to adjust the pH to 8.0 (pH adjustment 1).

An aqueous solution obtained by dissolving 0.23 parts of aluminum chloride as a flocculant in 10 parts of ion-exchanged water was added over 10 min while stirring at 30° C. After allowing to stand for 3 min, the temperature was started to rise up to 50° C., and associated particles were generated. In this state, the particle diameter of the associated particles was measured with a "Coulter Counter Multisizer 3" (registered trademark, manufactured by Beckman Coulter, Inc.). When the weight average particle diameter reached 6.0 μm, 0.9 part of sodium chloride and 5.0 parts of NEOGEN RK were added to stop the particle growth.

A 1 mol/L sodium hydroxide aqueous solution was added to adjust the pH to 9.0, and then the temperature was raised to 95° C. to spheroidize the aggregated particles. When the average circularity reached 0.980, the temperature was started to lower and cooling to room temperature was performed to obtain a toner particle dispersion liquid 1.

Hydrochloric acid was added to the obtained toner particle dispersion liquid 1 to adjust the pH to 1.5, and the mixture was allowed to stand under stirring for 1 h, followed by solid-liquid separation using a pressure filter to obtain a toner cake. This was reslurried with ion-exchanged water to form a dispersion liquid again, and then subjected to solid-liquid separation with the aforementioned filter. The reslurrying and solid-liquid separation were repeated until the electrical conductivity of the filtrate became 5.0 μS/cm or less, and then solid-liquid separation was finally performed to obtain a toner cake. The obtained toner cake was dried and further classified using a classifier to obtain toner particles 1.

Preparation Example of Toner Particles 2

Toner particles 2 were prepared in the same manner as toner particles 1, except that the resin particle dispersion liquid 1 was changed to the resin particle dispersion liquid 2 in the preparation example of toner particles 1.

Preparation Example of Toner Particles 3

Toner particles 3 were prepared in the same manner as toner particles 1, except that the number of parts of the flocculant added was changed to 0.08 parts, and hydrochloric acid was added to the toner particle dispersion liquid to adjust the pH to 1.0.

Preparation Example of Toner Particles 4

Toner particles 4 were prepared in the same manner as toner particles 1, except that the flocculant was changed to 500 parts of aluminum chloride 1-pentanol and was added dropwise over 1 h to adjust the pH to 2.0.

Preparation Example of Toner Particles 5

Toner particles 5 were prepared in the same manner as toner particles 1, except that the flocculant was changed from aluminum chloride to iron (III) chloride and the number of parts added was 0.50 parts.

Preparation Example of Toner Particles 6

Toner particles 6 were prepared in the same manner as toner particles 1, except that the flocculant was changed from aluminum chloride to iron (III) chloride, the number of parts added was 0.30 parts, and hydrochloric acid was added to the toner particle dispersion liquid to adjust the pH to 1.0.

Production Example of Toner Particles 7

Toner particles 7 were prepared in the same manner as toner particles 1, except that the flocculant was changed from aluminum chloride to iron (III) chloride, the number of parts added was 2.80 parts, and hydrochloric acid was added to the toner particle dispersion liquid to adjust the pH to 2.0.

Preparation Example of Toner Particles 8

Toner particles 8 were prepared in the same manner as toner particles 1, except that the flocculant was changed from aluminum chloride to calcium chloride and the number of parts added was 0.10 parts.

Preparation Example of Toner Particles 9

Toner particles 9 were prepared in the same manner as toner particles 1, except that the flocculant was changed from aluminum chloride to calcium chloride, the number of parts added was 0.05 parts, and hydrochloric acid was added to the toner particle dispersion liquid to adjust the pH to 1.0.

Preparation Example of Toner Particles 10

Toner particles 10 were prepared in the same manner as toner particles 1, except that the flocculant was changed from aluminum chloride to calcium chloride, the number of parts added was 1.60 parts, and hydrochloric acid was added to the toner particle dispersion liquid to adjust the pH to 2.0.

Preparation Example of Toner Particles 11

Toner particles 11 were prepared in the same manner as toner particles 1, except that the flocculant was changed from aluminum chloride to magnesium sulfate and the number of parts added was 0.15 parts.

Preparation Example of Toner Particles 12

Toner particles 12 were prepared in the same manner as toner particles 1, except that the flocculant was changed from aluminum chloride to magnesium sulfate, the number of parts added was 0.08 parts, and hydrochloric acid was added to the toner particle dispersion liquid to adjust the pH to 1.0.

Preparation Example of Toner Particles 13

Toner particles 13 were prepared in the same manner as toner particles 1, except that the flocculant was changed from aluminum chloride to magnesium sulfate, the number of parts added was 1.80 parts, and hydrochloric acid was added to the toner particle dispersion liquid to adjust the pH to 2.0.

Preparation Example of Toner Particles 14

Toner particles 14 were prepared in the same manner as toner particles 1, except that 0.50 parts of iron (III) chloride was added in addition to aluminum chloride as the flocculant.

Preparation Example of Toner Particles 15

Toner particles 15 were prepared in the same manner as toner particles 1, except that 0.05 parts of calcium chloride was added in addition to aluminum chloride as the flocculant.

Production Example of Toner Particles 16

Toner particles 16 were prepared in the same manner as toner particles 1, except that the number of parts of aluminum chloride added as the flocculant was 2.00 parts, 2.80 parts of iron (III) chloride was additionally added, and hydrochloric acid was added to the toner particle dispersion liquid to adjust the pH to 2.0.

Production Example of Toner Particles 17

Toner particles 17 were obtained in the same manner as toner particles 1, except that the number of parts of the flocculant added was 0.08 parts, and hydrochloric acid was added to the toner particle dispersion liquid to adjust the pH to 0.8.

Production of Toner 1

Using an FM mixer ("FM-10B", manufactured by Nippon Coke Industry Co., Ltd.) at a rotation speed of 3500 rpm, 100 parts of toner particles 1 and 1.5 parts of silica fine particles 1 were loaded and mixed for 180 sec to obtain a toner mixture.

After that, coarse particles were removed using a sieve of 300 mesh (48 μm opening) to obtain a toner 1. Tables 2-1 and 2-2 show the production conditions and physical properties.

Toners 2 to 39

Toners 2 to 39 were produced by performing the same operations as in the production example of toner 1, except that the type of toner particles, the type of silica fine particles, and the number of added parts of silica fine particles were changed as shown in Tables 2-1 and 2-2. Tables 2-1 and 2-2 show the production conditions and physical properties.

The following evaluations were performed using the obtained toner.

(1) Liquid-Bridging Force Evaluation Method

For the evaluation of liquid-bridging force, a vibration-type adhesion measuring device reported in KONICA MINOLTA TECHNOLOGY REPORT VOL 1 (2004) p 16 is used.

As an overview of the device, a toner mixed with a magnetic carrier and triboelectrically charged is developed and electrostatically adhered to a sample stage by a two-component development method. The sample stage coated with a polycarbonate, which is also used for the photosensitive member surface, is used. Further, the sample stage is mounted on a vibration unit in which a horn for amplitude amplification is connected to a piezoelectric vibrator, and the vibrator is vibrated to give vibration acceleration to the toner. Vibration acceleration is given by dividing from 0 $Mm/sec^2$ to 2 $Mm/sec^2$ into 24 segments. Detachment of the toner from a sample electrode is observed with a CCD, and the vibration acceleration when 50% of the toner is detached from the initial state in terms of area ratio is calculated.

Here, where the vibration amplitude is A, the vibration angular velocity of the vibrator is $\omega$, and the toner mass is m, the inertial force acting on the toner is given by $F=mA\omega^2$. The gravitational force associated with the toner is sufficiently small with respect to the adhesion force and, therefore, can be ignored. Since the force of inertia when the toner is separated is equal to the adhesion force of the toner, the calculation is performed by the above equation.

The measurement is carried out in a high-temperature and high-humidity environment and a low-temperature and low-humidity environment. The difference between the adhesion strength in the high-temperature and high-humidity environment and the adhesion strength in the low-temperature and low-humidity environment is taken as the liquid-bridging force to evaluate the liquid-bridging force of the toner. At this time, the mass m of the toner is calculated from $m=\pi/6\times r^3\times\rho$ from the number-average particle diameter r of the toner and the true density ρ of the toner.

The FIGURE shows an outline of the device for measuring the liquid-bridging force. A total of 3 g of toner is placed in a developing device 1, and a developing sleeve 1-1 is rotated to coat the toner on the sleeve 1-1. At this time, the toner coated on the sleeve 1-1 is visually checked, and where the coating amount needs to be adjusted, the adjustment is performed by the distance between a developing blade (not shown in the FIGURE) provided in the developing device and the sleeve 1-1.

A vibration unit 2 is composed of a vibrator 2-1, a horn 2-2, and a sample stage 2-3. A thin film of a polycarbonate resin (Bisphenol Z type, trade name: IUPILON Z200, manufactured by Mitsubishi Gas Chemical Company, Inc.) is bonded to the surface of the sample stage 2-3.

While rotating the developing sleeve 1-1, the vibration unit 2 is moved to pass over the sleeve 1-1 (development position). At that time, the rotation speed of the sleeve 1-1 is 0.1 m/sec, and the moving speed of the vibration unit 2 is 0.001 m/sec.

Also, when the vibration unit 2 passes over the sleeve 1-1, a voltage is applied between the sleeve 1-1 and the sample stage 2-3 to develop (cause to fly) the toner on the sample stage 2-3. The electric field strength at this time can be adjusted by the voltage applied between the sleeve 1-1 and the sample stage 2-3 and the gap therebetween by the triboelectric charge quantity of the toner or the like. As a guideline, the electric field strength is 0.5 V/m.

After the toner is developed on the sample stage 2-3, the vibration unit 2 is moved to the vibration position, and the toner adhesion state is checked by a CCD 3-3 equipped with an objective lens 3-1 and a lens barrel 3-2. As for the performance of a detection unit 3, the lens 3-1 and the CCD 3-3 are selected so that the resolution is 0.22 and the field of view is 570 μm×427 μm.

Here, the state of toner adhesion is such that one or two layers of toner are laminated over the entire field of view. The state is determined by the presence of toner particles in the entire field of view after development compared to that before development by using an image from the detection unit 3.

After the toner is adhered to the sample stage 2-3, an ionizer (not shown in the FIGURE) is used to neutralize the charge of the toner, and the sample stage 2-3 is vibrated by the vibrator 2-1. The amplification is performed from a transmitter 4 via the vibrator 2-1 and the horn 2-2, and the sample stage 2-3 is vibrated. The vibration acceleration ($=A\omega^2$) is divided from 0 to $2\times10^6$ m/sec$^2$ into 24 segments so that the sample stage 2-3 can be vibrated intermittently. Incidentally, during vibration, a vacuum cleaner 5 is used to collect the toner detached from the sample stage 2-3.

The adhesion state of the toner is synchronized so as to be taken in by a personal computer 3-4 from the CCD 3-3 after the vibration acceleration has been applied to the sample stage 2-3. After the vibration acceleration has been applied up to $2\times10^6$ m/sec$^2$, the state of the toner is subjected to image processing using image processing software (Photoshop, manufactured by Adobe Inc.).

Specifically, where the obtained image is binarized, a portion where the toner adheres is converted to black. When no vibration acceleration is applied, the toner is present in the entire field of view, so the area ratio of the portion converted to black becomes a value close to 100%. As the vibration acceleration is increased from there, the area ratio of the portion converted to black decreases when the toner is detached from the sample stage 2-3 at a certain vibration acceleration. From the vibration acceleration applied when the area ratio reaches 50%, the toner inertia force (=adhesive force F) is obtained from the above equation.

The difference between the adhesive strength in a high-temperature and high-humidity environment and the adhesive strength in a low-temperature and low-humidity environment was evaluated as the liquid-bridging force, and C or higher was determined to be good.

A: Liquid-bridging force is less than 10 nN.

B: Liquid-bridging force is 10 nN or more and less than 20 nN.

C: Liquid-bridging force is 20 nN or more and less than 30 nN.

D: Liquid-bridging force is 30 nN or more and less than 40 nN.

E: Liquid-bridging force is 40 nN or more and less than 50 nN.

F: Liquid-bridging force is 50 nN or more.

A method for evaluating each of toners 1 to 39 will be described hereinbelow. The evaluation results are presented in Table 3.

The evaluation method and evaluation criteria are as follows.

A commercially available laser printer "LBP-9660Ci (manufactured by Canon Inc.)" modified so that the process speed was 325 mm/sec was used as an image forming apparatus. A commercially available toner cartridge (cyan) (manufactured by Canon Inc.), which is a process cartridge, was used.

The product toner was removed from the inside of the cartridge, and after cleaning with an air blow, 270 g of each toner to be evaluated was filled. The yellow, magenta, and black stations were evaluated by removing product toner and inserting yellow, magenta, and black cartridges in which the remaining toner amount detection mechanism was disabled.

(2) Evaluation of Transfer Unevenness

The process cartridge, the modified laser printer, and evaluation paper CS-680 (A4, basis weight 68 g/m$^2$, smoothness 45 sec, sold by Canon USA) and Multi-Purpose Paper (A4, basis weight 75 g/m$^2$, smoothness 25 sec, sold by Canon USA) with different smoothness were allowed to stand in a high-temperature and high-humidity environment (30° C./80% RH) for 24 h. By using an evaluation sheet with low smoothness and large irregularities, it is possible to make a stricter evaluation of transfer unevenness.

After outputting 1000 sheets of images with a print ratio of 1.0% using evaluation paper CS-680, a solid image with a toner laid-on level of 0.40 mg/cm$^2$ was output on evaluation paper CS-680 and Multi-Purpose Paper.

Furthermore, after outputting 24000 sheets of images with a print ratio of 1.0% using evaluation paper CS-680, a solid image with a toner laid-on level of 0.40 mg/cm$^2$ was output to Multi-Purpose Paper.

Images on evaluation paper with different smoothness after outputting 1000 sheets and images on evaluation paper with low smoothness after outputting 25000 sheets (after endurance) were visually observed, and transfer unevenness was evaluated based on the following criteria. Note that in the present disclosure, a portion where image uniformity is impaired is determined to be transfer unevenness.

A: Transfer unevenness is not seen even under normal light or when held up to strong light.

B: Almost no transfer unevenness can be seen even under normal light or when held up to strong light.

C: Transfer unevenness is not visible under normal light, but transfer unevenness is visible when held up to strong light.

D: Even under normal light, transfer unevenness can be seen in 1 or 2 locations, but no blank dots are seen.

E: Even under normal light, transfer unevenness can be seen in 3 or 4 locations, but no blank dots are seen.

F: Even under normal light, transfer unevenness can be seen in 5 or more locations, one or more blank dots are seen.

D or higher was determined as good, and B or higher (B or A) was determined as even better.

(3) Evaluation of Transfer Dust

A grid pattern with a spacing of 1 cm that consisted of lines having a thickness of 100 μm (thickness in electrostatic latent image) was output on LETTER size Business 4200 paper (manufactured by XEROX, 75 $g/m^2$) under a low-temperature and low-humidity environment (15° C./10% RH).

The grid pattern image was observed using a loupe with a magnification of 25 times, and the transfer dust was evaluated based on the following criteria.

A grade of B or higher was determined to be good.

A: The lines are very sharp and there is almost no transfer dust.

B: Toner is slightly scattered, and the lines are sharp.

C: Slightly larger amount of toner is scattered, but the lines are relatively sharp.

D: A lot of toner is scattered, and the lines are vague.

(4) Graininess of Halftone Image

A halftone image (49th gradation as counted from the solid white image when dividing into 256 gradation from solid white to solid black) was visually observed on LETTER size Business 4200 paper (manufactured by XEROX, 75 $g/m^2$) under a high-temperature and high-humidity environment (30° C./80% RH), and the graininess (roughness) of the image was evaluated according to the following criteria.

A grade of B or higher was determined to be good.

A: The image is smooth with no feeling of roughness.

B: Roughness is not felt so much.

C: There is a slight feeling of roughness.

D: There is a clear feeling of roughness.

TABLE 1-1

| Silica fine particle No. | Base BET/ $m^2/g$ | First treatment component: Treatment agent | First treatment component: Fill/ kPa | First treatment component: Reaction time/h | Second treatment component: Terminal R1 group structure | Second treatment component: Terminal R2 group structure | Second treatment component: m | Second treatment component: Number of parts for treatment | Treatment temperature |
|---|---|---|---|---|---|---|---|---|---|
| 1 | 200 50 (10:1) | Octamethyltetrasiloxane | 200 | 1 | Methyl group | Methyl group | 101 | 10 | 330° C. |
| 2 | 200 50 (10:1) | Octamethyltetrasiloxane | 200 | 3 | Methyl group | Methyl group | 101 | 10 | 330° C. |
| 3 | 200 50 (10:1) | Octamethyltetrasiloxane | 200 | 2 | Methyl group | Methyl group | 101 | 13 | 330° C. |
| 4 | 200 50 (10:1) | Octamethyltetrasiloxane | 200 | 1 | Methyl group | Methyl group | 101 | 8 | 330° C. |
| 5 | 200 50 (10:1) | Octamethyltetrasiloxane | 200 | 2 | Methyl group | Methyl group | 101 | 8 | 330° C. |
| 6 | 200 50 (10:1) | Octamethyltetrasiloxane | 200 | 1 | Methyl group | Methyl group | 101 | 12 | 330° C. |
| 7 | 200 50 (6:1) | Octamethyltetrasiloxane | 200 | 1 | Methyl group | Methyl group | 101 | 10 | 330° C. |
| 8 | 200 | Octamethyltetrasiloxane | 200 | 1 | Methyl group | Methyl group | 101 | 10 | 330° C. |
| 9 | 200 | Octamethyltetrasiloxane | 200 | 1 | Carbinol group | Carbinol group | 93 | 10 | 330° C. |
| 10 | 380 | Octamethyltetrasiloxane | 200 | 1 | Carbinol group | Carbinol group | 93 | 11 | 330° C. |
| 11 | 380 | Octamethyltetrasiloxane | 200 | 1 | Carbinol group | Carbinol group | 93 | 10 | 330° C. |
| 12 | 300 | Octamethyltetrasiloxane | 240 | 1 | Carbinol group | Carbinol group | 93 | 5 | 330° C. |
| 13 | 30 | Octamethyltetrasiloxane | 240 | 1 | Carbinol group | Carbinol group | 60 | 3 | 330° C. |
| 14 | 380 | Octamethyltetrasiloxane | 240 | 1 | Carbinol group | Carbinol group | 93 | 10 | 330° C. |
| 15 | 200 | Octamethyltetrasiloxane | 100 | 1 | Methyl group | Methyl group | 101 | 15 | 290° C. |
| 16 | 200 | Octamethyltetrasiloxane | 100 | 1 | — | — | — | 0 | 250° C. |
| 17 | 200 | — | — | — | Methyl group | Methyl group | 101 | 30 | 250° C. |
| 18 | 200 | — | — | — | Methyl group | Methyl group | 101 | 20 | 250° C. |
| 19 | 200 | — | — | — | Methyl group | Methyl group | 101 | 30 | 330° C. |
| 20 | 200 | Hexamethyldisilazane | 25 | 1 | Methyl group | Methyl group | 101 | 10 | 250° C. |
| 21 | 200 | Hexamethyldisilazane | 25 | 1 | — | — | — | 0 | 250° C. |

In the table, for the silica fine particles 1 to 7, it is indicated in the "Base BET/$m^2$/g" column that small particle diameter silica having a BET specific surface area of 200 $m^2$/g and large particle diameter silica having a BET specific surface area of 50 $m^2$/g are used at a small particle diameter silica:large particle diameter silica mass ratio of 10:1 (6:1 for the silica fine particles 7). Regarding the fill, the example using hexamethyldisilazane indicates the number of parts.

TABLE 1-2

| Silica fine particle No. | Presence/ absence of (1) | B | Sn | D1/D | DSB $\times 10^{-4}$ | DSB-W $\times 10^{-4}$ | C immobilization ratio/% | Number-average particle diameter/nm | X/Y |
|---|---|---|---|---|---|---|---|---|---|
| 1 | Present | 117 | 0.15 | 0.20 | 15 | 10 | 63 | 18 | 0.75 |
| 2 | Present | 125 | 0.05 | 0.27 | 17 | 10 | 60 | 19 | 1.00 |
| 3 | Present | 121 | 0.05 | 0.17 | 21 | 12 | 57 | 20 | 0.68 |
| 4 | Present | 128 | 0.19 | 0.27 | 9.4 | 6.1 | 65 | 17 | 1.05 |
| 5 | Present | 137 | 0.16 | 0.30 | 12 | 7.9 | 64 | 18 | 1.15 |
| 6 | Present | 105 | 0.13 | 0.11 | 20 | 12 | 60 | 19 | 0.62 |
| 7 | Present | 112 | 0.14 | 0.19 | 14 | 8.6 | 60 | 21 | 0.80 |
| 8 | Present | 131 | 0.15 | 0.20 | 15 | 9.3 | 64 | 16 | 0.81 |
| 9 | Present | 130 | 0.16 | 0.18 | 15 | 10 | 66 | 17 | 0.76 |
| 10 | Present | 240 | 0.15 | 0.15 | 10 | 6.8 | 68 | 6 | 0.67 |
| 11 | Present | 247 | 0.17 | 0.20 | 9 | 6.5 | 73 | 5 | 0.73 |
| 12 | Present | 210 | 0.19 | 0.19 | 5.7 | 4.9 | 85 | 10 | 2.46 |
| 13 | Present | 27 | 0.17 | 0.25 | 48 | 48 | 100 | 38 | 4.71 |
| 14 | Present | 247 | 0.17 | 0.20 | 5.7 | 1.7 | 30 | 6 | 0.73 |
| 15 | Present | 128 | 0.25 | 0.28 | 20 | 10 | 48 | 17 | 0.44 |
| 16 | Present | 178 | 0.38 | 0.40 | 5.6 | 4.5 | 80 | 14 | — |
| 17 | Present | 105 | 0.35 | 0.28 | 29 | 19 | 65 | 19 | — |
| 18 | Present | 111 | 0.40 | 0.28 | 23 | 16 | 70 | 17 | — |
| 19 | Present | 95 | 0.20 | 0.25 | 60 | 47 | 79 | 22 | — |
| 20 | Present | 110 | 0.10 | 0.00 | 14 | 7.2 | 53 | 17 | — |
| 21 | Absent | 131 | 0.10 | 0.00 | 0 | 0 | 95 | 14 | — |

In the "Presence/absence of (1)" column, where a fragment ion corresponding to the structure represented by formula (1) is observed by TOF-SIMS, "Present" is entered.

In the representation of DSB and DSB-W, ZZ$\times 10^{-4}$ is synonymous with Z.Z.$\times 10^{-3}$. For example, 15$\times 10^{-4}$ is synonymous with 1.5$\times 10^{-3}$.

TABLE 2-1

| Toner No. | Toner particle | Silica fine particle | Particle diameter µm | Number of added parts of silica fine particles | Ssi, % by area | Polyvalent metal element | Content of polyvalent metal element (ppm) |
|---|---|---|---|---|---|---|---|
| 1 | Toner particle 1 | Silica fine particle 1 | 6.2 | 1.5 | 44 | Aluminum | 40 |
| 2 | Toner particle 2 | Silica fine particle 1 | 7.4 | 1.5 | 52 | Aluminum | 35 |
| 3 | Toner particle 1 | Silica fine particle 2 | 6.2 | 1.5 | 44 | Aluminum | 40 |
| 4 | Toner particle 1 | Silica fine particle 3 | 6.2 | 1.5 | 43 | Aluminum | 40 |
| 5 | Toner particle 1 | Silica fine particle 4 | 6.2 | 1.5 | 44 | Aluminum | 40 |
| 6 | Toner particle 1 | Silica fine particle 5 | 6.2 | 1.5 | 44 | Aluminum | 40 |
| 7 | Toner particle 1 | Silica fine particle 6 | 6.2 | 1.5 | 44 | Aluminum | 40 |
| 8 | Toner particle 1 | Silica fine particle 7 | 6.2 | 1.5 | 43 | Aluminum | 40 |
| 9 | Toner particle 1 | Silica fine particle 8 | 6.2 | 1.5 | 44 | Aluminum | 40 |
| 10 | Toner particle 3 | Silica fine particle 8 | 6.2 | 1.5 | 44 | Aluminum | 6 |
| 11 | Toner particle 4 | Silica fine particle 8 | 5.8 | 1.5 | 38 | Aluminum | 960 |
| 12 | Toner particle 5 | Silica fine particle 8 | 6.6 | 1.5 | 45 | Iron | 400 |
| 13 | Toner particle 6 | Silica fine particle 8 | 7.6 | 1.5 | 54 | Iron | 12 |
| 14 | Toner particle 7 | Silica fine particle 8 | 5.9 | 1.5 | 37 | Iron | 1900 |
| 15 | Toner particle 8 | Silica fine particle 8 | 6.3 | 1.5 | 42 | Calcium | 6 |
| 16 | Toner particle 9 | Silica fine particle 8 | 7.5 | 1.5 | 49 | Calcium | 1 |
| 17 | Toner particle 10 | Silica fine particle 8 | 5.7 | 1.5 | 39 | Calcium | 180 |
| 18 | Toner particle 11 | Silica fine particle 8 | 6.3 | 1.5 | 42 | Magnesium | 20 |
| 19 | Toner particle 12 | Silica fine particle 8 | 7.5 | 1.5 | 53 | Magnesium | 2 |
| 20 | Toner particle 13 | Silica fine particle 8 | 5.8 | 1.5 | 36 | Magnesium | 380 |

TABLE 2-2

| Toner No. | Toner particle | Silica fine particle | Particle diameter μm | Number of added parts of silica fine particles | Ssi, % by area | Polyvalent metal element | Content of polyvalent metal element (ppm) |
|---|---|---|---|---|---|---|---|
| 21 | Toner particle 14 | Silica fine particle 8 | 6.2 | 1.5 | 43 | Aluminum | 40 |
| | | | | | | Iron | 400 |
| 22 | Toner particle 15 | Silica fine particle 8 | 6.5 | 1.5 | 43 | Aluminum | 50 |
| | | | | | | Calcium | 5 |
| 23 | Toner particle 15 | Silica fine particle 8 | 6.5 | 2.2 | 57 | Aluminum | 50 |
| | | | | | | Calcium | 5 |
| 24 | Toner particle 15 | Silica fine particle 8 | 6.5 | 0.3 | 28 | Aluminum | 50 |
| | | | | | | Calcium | 4 |
| 25 | Toner particle 15 | Silica fine particle 9 | 6.5 | 1.5 | 35 | Aluminum | 50 |
| | | | | | | Calcium | 5 |
| 26 | Toner particle 15 | Silica fine particle 10 | 6.5 | 0.3 | 31 | Aluminum | 50 |
| | | | | | | Calcium | 5 |
| 27 | Toner particle 15 | Silica fine particle 11 | 6.5 | 0.3 | 32 | Aluminum | 50 |
| | | | | | | Calcium | 5 |
| 28 | Toner particle 15 | Silica fine particle 12 | 6.5 | 0.3 | 30 | Aluminum | 50 |
| | | | | | | Calcium | 5 |
| 29 | Toner particle 15 | Silica fine particle 13 | 6.5 | 0.3 | 22 | Aluminum | 50 |
| | | | | | | Calcium | 5 |
| 30 | Toner particle 15 | Silica fine particle 14 | 6.5 | 0.3 | 32 | Aluminum | 50 |
| | | | | | | Calcium | 5 |
| 31 | Toner particle 1 | Silica fine particle 15 | 6.2 | 1.5 | 44 | Aluminum | 40 |
| 32 | Toner particle 1 | Silica fine particle 16 | 6.2 | 1.5 | 44 | Aluminum | 40 |
| 33 | Toner particle 1 | Silica fine particle 17 | 6.2 | 1.5 | 45 | Aluminum | 40 |
| 34 | Toner particle 1 | Silica fine particle 18 | 6.2 | 1.5 | 44 | Aluminum | 40 |
| 35 | Toner particle 1 | Silica fine particle 19 | 6.2 | 1.5 | 44 | Aluminum | 40 |
| 36 | Toner particle 1 | Silica fine particle 20 | 6.2 | 1.5 | 44 | Aluminum | 40 |
| 37 | Toner particle 1 | Silica fine particle 21 | 6.2 | 1.5 | 44 | Aluminum | 40 |
| 38 | Toner particle 16 | Silica fine particle 1 | 6.4 | 1.5 | 44 | Aluminum | 400 |
| | | | | | | Iron | 1900 |
| 39 | Toner particle 17 | Silica fine particle 1 | 6.3 | 1.5 | 45 | — | |

In toner particles 17, no polyvalent metal element was detected. In toner particles 1 to 16, a polyvalent metal element was present on the surface. The particle diameter is the weight-average particle diameter (D4). The polyvalent metal element content is measured by the method described in the measurement method (a) to (c).

TABLE 3

| Example No. | Toner No. | Liquid-bridging force (nN) | Transfer unevenness (smoothness 45 sec) | Transfer unevenness (smoothness 25 sec) | Transfer unevenness after durability (smoothness 25 sec) | Transfer dust | Halftone graininess |
|---|---|---|---|---|---|---|---|
| 1 | 1 | A (4) | A | A | A | A | A |
| 2 | 2 | A (4) | A | A | A | A | A |
| 3 | 3 | B (11) | A | B | B | A | A |
| 4 | 4 | B (14) | A | B | B | A | A |
| 5 | 5 | B (16) | A | B | B | A | B |
| 6 | 6 | B (14) | A | B | B | A | B |
| 7 | 7 | B (12) | A | B | B | A | A |
| 8 | 8 | A (8) | A | A | B | A | A |
| 9 | 9 | A (8) | A | A | B | A | A |
| 10 | 10 | B (12) | A | B | C | B | A |
| 11 | 11 | B (15) | A | B | C | A | B |
| 12 | 12 | A (7) | A | A | B | A | A |
| 13 | 13 | B (12) | A | B | C | B | A |
| 14 | 14 | B (18) | A | B | C | A | B |
| 15 | 15 | B (12) | A | B | B | A | A |
| 16 | 16 | B (15) | A | B | C | B | A |
| 17 | 17 | B (18) | A | B | C | A | B |
| 18 | 18 | B (14) | A | B | B | A | A |
| 19 | 19 | B (17) | A | B | C | B | A |
| 20 | 20 | B (19) | A | B | C | A | B |
| 21 | 21 | A (9) | A | A | B | A | B |
| 22 | 22 | B (12) | A | B | B | A | B |
| 23 | 23 | B (16) | A | C | B | C | A |
| 24 | 24 | B (19) | A | B | C | A | A |
| 25 | 25 | B (18) | A | B | C | A | B |
| 26 | 26 | B (19) | B | C | D | B | B |

TABLE 3-continued

| Example No. | Toner No. | Liquid-bridging force (nN) | Transfer unevenness (smoothness 45 sec) | Transfer unevenness (smoothness 25 sec) | Transfer unevenness after durability (smoothness 25 sec) | Transfer dust | Halftone graininess |
|---|---|---|---|---|---|---|---|
| 27 | 27 | B (19) | B | C | D | B | B |
| 28 | 28 | C (24) | C | C | C | B | B |
| 29 | 29 | C (28) | C | C | D | B | B |
| 30 | 30 | C (26) | C | C | D | B | B |
| C.E. 1 | 31 | E (42) | E | E | F | B | D |
| C.E. 2 | 32 | E (42) | E | F | F | B | D |
| C.E. 3 | 33 | E (45) | E | F | F | B | C |
| C.E. 4 | 34 | E (45) | E | F | F | B | D |
| C.E. 5 | 35 | F (52) | E | F | F | D | B |
| C.E. 6 | 36 | F (54) | E | F | F | D | B |
| C.E. 7 | 37 | F (52) | F | F | F | D | B |
| C.E. 8 | 38 | F (56) | E | E | E | B | D |
| C.E. 9 | 39 | F (58) | E | E | E | D | B |

In the Table, "C.E." denotes "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-074949, filed Apr. 28, 2022, which is hereby incorporated by reference herein in its entirety.

What is claimed is:

1. A toner, comprising:

a toner particle;

a silica fine particle on a surface of the toner particle; and at least one polyvalent metal element selected from the group consisting of calcium, magnesium, aluminum and iron on the surface of the toner particle, wherein fragment ions corresponding to a structure represented by formula (1) are observed in a time-of-flight secondary ion mass spectrometry measurement of the silica fine particle, (1)

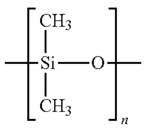

when n represents an integer of 1 or more, $Sn=\{(a-b)\times c\times NA\}/(d\times e)$ and $0.05\leq Sn\leq 0.20$ where 2.00 g of the silica fine particle is dispersed in a mixed liquid of 25.0 g of ethanol and 75.0 g of a 20% by mass NaCl aqueous solution and titration is performed using sodium hydroxide, when a is a NaOH titer (L) required to adjust the mixed liquid in which the silica fine particle is dispersed to pH 9.0, b is a NaOH titer (L) required to adjust the mixed liquid of 25.0 g of ethanol and 75.0 g of a 20% by mass NaCl aqueous solution to pH 9.0, c is the concentration (mol/L) of the NaOH solution used for titration, NA is Avogadro's number, d is the mass (g) of the silica fine particle, and e is a BET specific surface area ($nm^2/g$) of the silica fine particle, where in a chemical shift obtained by a solid-state $^{29}$Si-NMR DD/MAS method of the silica fine particle (D/S)/B is $5.7\times10^{-4}$ to $4.9\times10^{-3}$, (D/S)/B measured after washing the silica fine particle with chloroform is $1.7\times10^{-4}$ to $4.9\times10^{-3}$ and (D1/D) is 0.10 to 0.30, when D is an area of a peak having a peak top present in a range from −25 to −15 ppm, S is the sum of the peak areas of an M unit, a D unit, a T unit, and a Q unit present in a range from −140 to 100 ppm specific surface area of the silica fine particle, and D1 is an area of a peak having a peak top present in a range from more than −19 to −17 ppm or less in the chemical shift, and a total content of the polyvalent metal element is 1 to 2000 ppm measured by (a) to (c)

(a) stirring 50.0 mg of the toner particles with 5.00 g of 6.0 mol/L nitric acid aqueous solution to obtain an extract, (b) filtering the extract to prepare a measurement sample, and (c) measuring the measurement sample using an inductively coupled plasma mass spectrometer to determine a content of the polyvalent metal element based on the mass of the measurement sample.

2. The toner according to claim 1, wherein when measured by (a) to (c), the polyvalent metal element comprises 1 to 200 ppm by mass calcium, 2 to 400 ppm by mass magnesium, 5 to 1000 ppm by mass aluminum, and 10 to 2000 ppm by mass iron.

3. The toner according to claim 1, wherein a primary particle of the silica fine particle has a number-average particle diameter of 5 to 50 nm.

4. The toner according to claim 1, wherein Ssi is 30 to 90% by area when Ssi (area %) is a coverage ratio of the surface of the toner particle by the silica fine particle calculated from an image of the toner surface observed by a scanning electron microscope.

5. The toner according to claim 1, wherein the silica fine particle is surface-treated with a compound represented by formula (3)

(3)

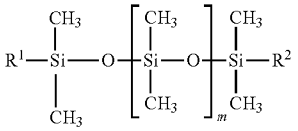

when $R^1$ and $R^2$ are independently a carbinol group, a hydroxy group, an epoxy group, a carboxy group, an alkyl group or a hydrogen atom, m is the average number of repeating units and is an integer of 1 to 200.

6. The toner according to claim 1, wherein the silica fine particle has a carbon amount immobilization rate of 30 to 70% after washing with chloroform.

7. The toner according to claim 1, wherein the silica fine particle was treated with cyclic siloxane and then treated with silicone oil.

8. The toner according to claim 1, wherein the silica fine particle comprises a silica fine particle A and a silica fine particle B, silica fine particle A has a primary particle with number-average particle diameter of 5 to 25 nm, silica fine particle B has a primary particle with a number-average particle diameter of more than 25 nm and 70 nm or less, and silica fine particle A and silica fine particle B are present at a mass-based content ratio of 20:1 to 5:1.

* * * * *